United States Patent
Baek et al.

(10) Patent No.: US 10,497,171 B2
(45) Date of Patent: Dec. 3, 2019

(54) SMART DEVICE AND METHOD FOR CONTROLLING SAME

(71) Applicant: LG ELECTRONICS INC., Seoul (KR)

(72) Inventors: Sungmin Baek, Seoul (KR); Choonghwan Shin, Seoul (KR); Byunghwa Lee, Seoul (KR); Sungjin Kim, Seoul (KR); Soungmin Im, Seoul (KR); Sangki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 15/741,394

(22) PCT Filed: Jan. 18, 2016

(86) PCT No.: PCT/KR2016/000499
§ 371 (c)(1),
(2) Date: Jan. 2, 2018

(87) PCT Pub. No.: WO2017/007101
PCT Pub. Date: Jan. 12, 2017

(65) Prior Publication Data
US 2018/0204375 A1    Jul. 19, 2018

(30) Foreign Application Priority Data

Jul. 3, 2015  (KR) ........................ 10-2015-0095199

(51) Int. Cl.
*G06T 17/05*      (2011.01)
*G06F 3/0346*     (2013.01)
(Continued)

(52) U.S. Cl.
CPC .............. *G06T 17/05* (2013.01); *A63F 13/00* (2013.01); *A63F 13/98* (2014.09); *G06F 1/163* (2013.01);
(Continued)

(58) Field of Classification Search
None
See application file for complete search history.

(56) References Cited

U.S. PATENT DOCUMENTS

2014/0189569 A1*  7/2014  Eleftheriou ........... G06F 3/0233
                                                   715/773
2014/0361956 A1   12/2014  Mikhailov et al.
(Continued)

FOREIGN PATENT DOCUMENTS

JP    2000-347128 A    12/2000
JP    2002-259976 A     9/2002
(Continued)

*Primary Examiner* — Vu Nguyen
(74) *Attorney, Agent, or Firm* — Birch, Stewart, Kolasch & Birch, LLP

(57) ABSTRACT

The present invention provides a smart device, which is configured to track the movement of the user's head, and a method for controlling the same. The present invention provides a smart device and a method for controlling the same, the smart device comprising: a body; an output device, which can be attached to/detached from the body, and which is configured to provide multiple reference points in a peripheral space; a camera for acquiring images of the provided reference points; and a control device configured to track the movement of the smart device using the acquired images.

20 Claims, 15 Drawing Sheets

(51) Int. Cl.
  *G06F 3/01*    (2006.01)
  *G06T 19/00*   (2011.01)
  *H04N 13/344*  (2018.01)
  *H04N 13/254*  (2018.01)
  *H04N 13/271*  (2018.01)
  *H04N 13/366*  (2018.01)
  *G06F 1/16*    (2006.01)
  *G06F 3/03*    (2006.01)
  *A63F 13/00*   (2014.01)
  *A63F 13/98*   (2014.01)
  *H04N 5/33*    (2006.01)

(52) U.S. Cl.
  CPC .......... *G06F 1/1626* (2013.01); *G06F 1/1684* (2013.01); *G06F 1/1686* (2013.01); *G06F 3/011* (2013.01); *G06F 3/012* (2013.01); *G06F 3/0304* (2013.01); *G06F 3/0325* (2013.01); *G06F 3/0346* (2013.01); *G06T 19/006* (2013.01); *H04N 13/254* (2018.05); *H04N 13/271* (2018.05); *H04N 13/344* (2018.05); *H04N 13/366* (2018.05); *A63F 2300/8082* (2013.01); *H04N 5/33* (2013.01)

(56) References Cited

U.S. PATENT DOCUMENTS

2015/0348327 A1* 12/2015 Zalewski .................. G06F 3/01
                                                    345/419
2016/0260251 A1*  9/2016 Stafford ................ G06T 19/006

FOREIGN PATENT DOCUMENTS

KR    10-2014-0146889 A    12/2014
KR       10-1524576 B1      6/2015

* cited by examiner (a)

(b)

SMART DEVICE AND METHOD FOR CONTROLLING SAME

CROSS REFERENCE TO RELATED APPLICATIONS:

This application is the National Phase of PCT International Application No. PCT/KR2016/000499, filed on Jan. 18, 2016, which claims priority under 35 U.S.C. 119(a) to Patent Application No. 10-2015-0095199, filed in Republic of Korea on Jul. 3, 2015, all of which are hereby expressly incorporated by reference into the present application.

TECHNICAL FIELD

The present invention relates to a smart device and a method for controlling the same, and more particularly, to a smart device for providing a virtual reality to a user and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Functions of mobile terminals are diversified. These functions include, for example, data and voice communication, photographing and video shooting through a camera, voice recording, music file playback through a speaker system, and outputting an image or video to a display unit. Some terminals are equipped with an electronic gaming function or multimedia player function. In particular, recently released mobile terminals are capable of receiving multicast signals for providing visual content, such as broadcast and video or television programs. In order to perform such functions, the mobile terminals may be basically connected to other devices or networks using various communication protocols, and provide ubiquitous computing to the user. That is, mobile terminals have evolved into smart devices that enable connectivity to a network and ubiquitous computing.

In recent years, as smart devices are increasingly used to play games and watch images, there are attempts to implement virtual reality on smart devices in order to provide users with a better experience. Virtual reality is based on stereoscopic images provided to users. Most smart devices are basically not designed to realize stereoscopic images. Therefore, in order to view stereoscopic images, separate software or hardware such as a dedicated application for realizing a stereoscopic image is required. In addition, even if a smart device is capable of realizing a complete stereoscopic image without any separate software or hardware, a separate extension device is required in order to allow a user to sufficiently enjoy stereoscopic images using a display of the smart device, which is relatively small. Recently, auxiliary devices capable of sufficiently providing a user with virtual reality, that is, a stereoscopic image enlarged to a sufficient size by using the display of a smart device have been developed according to the need. In particular, considering user convenience, these auxiliary devices are mostly designed to be mounted directly on the user's head, and the smart device may be mounted in the auxiliary devices to substantially provide virtual reality.

Unlike general virtual-reality-based functions such as watching movies or normal application execution, some functions, such as gaming may be performed as intended only when dynamic motion of a user is tracked. In order to optimally provide virtual reality regarding such functions, the head motion of the user reflecting change in the user's gaze needs to be tracked. Thus, since the smart device is worn on the user's head by the auxiliary device, motion of the head may be tracked by tracking the motion of the smart device. However, while smart devices are capable of providing most of the functionality required for virtual reality, they may not completely track their own motion (i.e., head motion) due to the limited functionality of the sensor.

Therefore, along with the above-mentioned auxiliary device, the smart device needs to be further improved so as to actually track motion thereof, that is, the head motion of the user, in order to optimally perform the virtual-reality-based function. In addition, a method for optimally controlling the improved smart device is required in order to perform the function of tracking the head motion, and further to improve the related user experience.

DISCLOSURE

Technical Problem

The present invention is directed to solving the above-mentioned problems and other problems. Accordingly, an object of the present invention is to provide a smart device configured to track motion of a user's head.

Another object of the present invention is to provide a method for optimally tracking motion of a user's head using the smart device.

Technical Solution

The object of the present invention can be achieved by providing a smart device including a body, an output device detachable from the body and configured to provide a plurality of reference points in a surrounding space, a camera configured to acquire images of the provided reference points, and a control device configured to track motion of the smart device using the acquired images.

The output device and the camera may continuously provide reference points and acquire images thereof while the smart device is moving. The reference points may have predetermined patterns to be easily recognized, the patterns being different from each other. The output device may provide reference points formed by infrared light, and the camera may include an infrared camera capable of photographing the infrared reference points.

The control device may construct a three-dimensional map of predetermined reference points based on positions of a predetermined number of the predetermined reference points acquired from the images, continuously detect a relative positional change of the predetermined reference points with respect to the three-dimensional map using the images, and continuously detect a position of the smart device based on the detected positional change. In addition, the control device may extend the three-dimensional map based on positions of additional reference points as a range of motion of the smart device extends.

The output device may include a light source configured to emit infrared laser, and a converter configured to convert the emitted infrared laser into the plurality of reference points. The converter may include a diffusing member configured to uniformly disperse the emitted infrared laser. In this case, the converter may further include a filter configured to selectively pass the infrared laser dispersed by the diffusing member to emit the reference points. The converter may be configured to diffract the emitted infrared laser to form the plurality of reference points. The converter may be configured to reflect the emitted infrared laser in a plurality of directions to form the plurality of reference points.

The output device may be disposed at a location spaced apart from the body to provide the plurality of reference points. The output device may further include a fin configured to dissipate heat and to contractively extend from the output device, wherein the output device may be configured to adjust an orientation thereof to provide the reference points in a desired space. The smart device may share a plurality of reference points provided by an output device of another smart device to track the motion thereof. The smart device may further include a sensing device configured to sense attachment and detachment of the output device.

The smart device may further include a head-mounted device configured to accommodate the body, the head-mounted device being worn on a head of a user. The controller may track motions of the head-mounted device and the head of the user wearing the smart device by tracking the motion of the smart device.

In another aspect of the present invention, provided herein is a method for controlling a smart device, including searching for a plurality of reference points in a surrounding space when it is necessary to track motion of a smart device, emitting the reference points and searching for an output device available in the smart device when the plurality of reference points is not found, and operating the available output device when the output device is found.

The operating may include removing an output device mounted on the smart device from the smart device, and disposing the removed output device at a position spaced apart the smart device. The operating may include operating one of the output device of the smart device and an output device of another smart device.

The method may further include notifying a user that the output device should be removed from the smart device so as to be used at a remote location, the notifying being performed prior to the operating step. The method may further include sensing whether the output device has been removed from the smart device, the sensing being performed prior to the notifying.

The method may further include notifying a user that the available output device should be searched for when the available output device is not found.

The searching may be performed when the smart device executes a specific application or when motion of the smart device occurs beyond a predetermined range.

The method may further include, when the plurality of reference points is found in the searching, continuously acquiring, by the smart device, images of the reference points while the smart device is moving, constructing a three-dimensional map of predetermined reference points based on positions of a predetermined number of the predetermined reference points acquired from the images, continuously detecting a relative positional change of the predetermined reference points with respect to the constructed three-dimensional map using the images, and continuously detecting a position of the smart device based on the detected positional change.

The searching of the output device may include searching for an output device mounted on the smart device and an output device removed from the smart device, or searching for an output device of the smart device and an available output device of another smart device.

In another aspect of the present invention, provided herein is a smart device including a body, an output device detachable from the body and configured to provide a plurality of reference points in a surrounding space, a camera configured to acquire images of the provided reference points, and a control device configured to track motion of the smart device using the acquired images, wherein, when the plurality of reference points is not found through the camera, the control device may notify a user that the output device should be removed from the smart device before the output device is operated.

The control device may be configured to sense whether the output device has been removed from the smart device before notifying that the output device should be removed. The control device may immediately operate the output device when it is sensed that the output device has been removed, wherein, when it is sensed that the output device is mounted, the control device may notify the user that the output device should be removed.

The control device may be configured to share reference points provided by an output device of another smart device to track the motion of the smart device.

When the plurality of reference points is not found, the control device may be configured to operate one of the output device of the smart device and an output device of another smart device.

When there is no available output device, the control device may notify the user that an available output device should be searched for.

Advantageous Effects

In the present invention, a smart device has an output device configured to provide reference points in a surrounding space. Relative change in position of the smart device according to motion of the smart device may be detected using the reference points, and motion of a user's head may be tracked based on change in position of the smart device. Therefore, the smart device according to the present invention may provide better optimized virtual reality to the user.

In addition, in the control method according to the present invention, a time of a motion may be determined by detecting a special case in which motion tracking is required. In addition, in the control method, the smart device and the output device thereof may be appropriately prepared to track motion after tracking is determined. Therefore, the control method of the present invention may effectively track the motion of the smart device and the head, and allow the user to more conveniently experience virtual reality.

The scope of applicability of the present invention will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

BEST MODE

Figure 1:
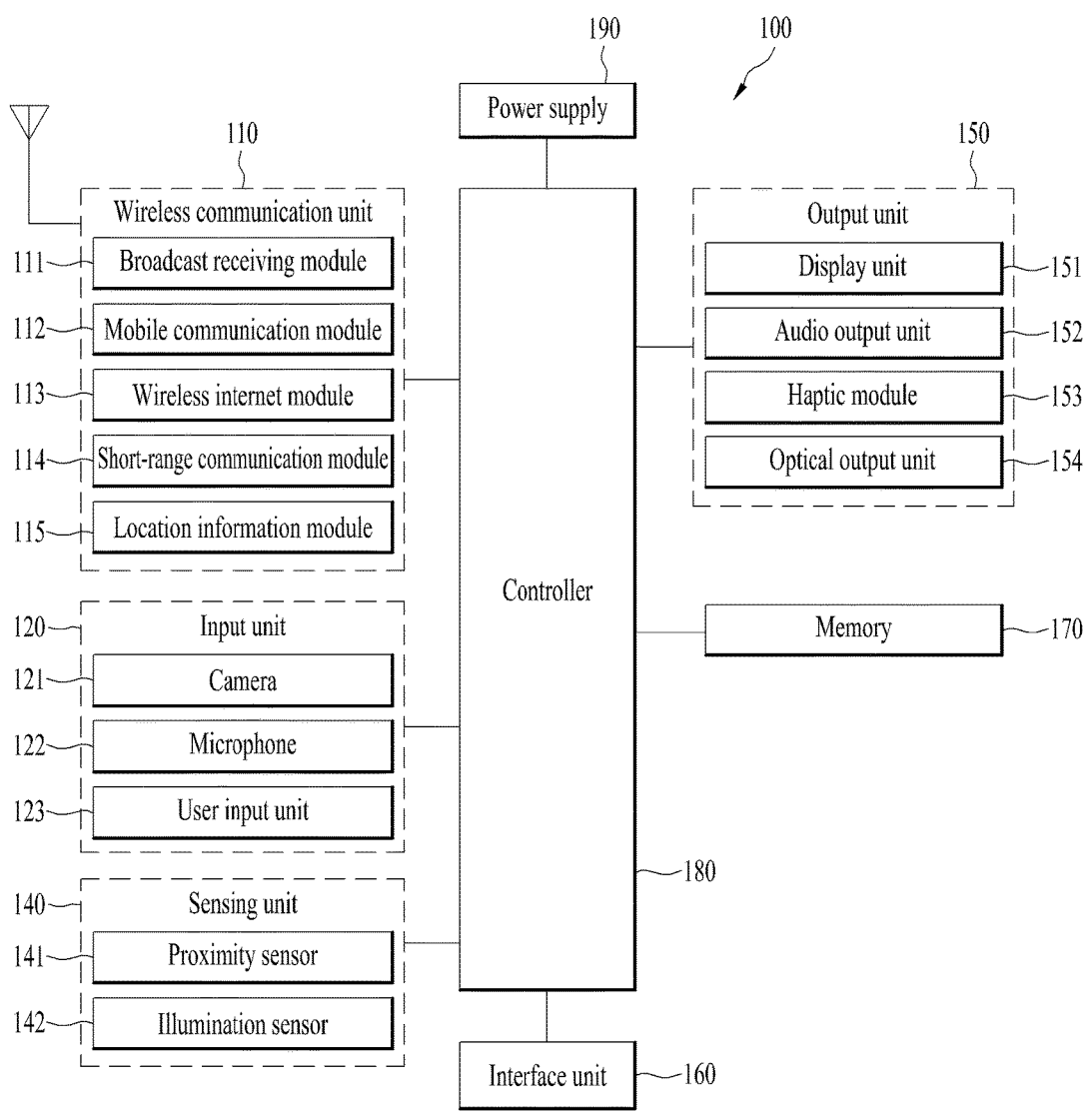
FIG. 1 is a block diagram illustrating the configuration of a smart device described in this application.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first (1st), second (2nd), etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Smart devices presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. By way of non-limiting example only, further description will be made with reference to particular types of smart devices. However, such teachings apply equally to other types of smart devices, such as those types noted above.

FIG. 1 is a block diagram to describe a smart device related to the present application. A general configuration of the smart device is described with reference to FIG. 1 as follows.

First of all, the smart device 100 may include components such as a wireless communication unit 110, an input unit 120, a sensing unit 140, an output unit 150, an interface unit 160, a memory 170, a controller 180, a power supply unit 190, and the like. It is appreciated that implementing all of the components shown in FIG. 1 is not a requirement, and that greater or fewer components may alternatively be implemented. Moreover, the real shapes and structures of the aforementioned components are not illustrated all but the shapes and structures of some significant components are shown in the drawings following FIG. 1. Yet, it is apparent to those skilled in the art that components described without being illustrated can be included in the smart watch to embody the functions of a smart device.

In particular, among the above-listed components, the wireless communication unit 110 typically includes one or more modules which permit communications such as wireless communications between the smart device 100 and a wireless communication system, communications between the smart device 100 and another smart device, communications between the smart device 100 and an external server. Further, the wireless communication unit 110 typically includes one or more modules which connect the smart device 100 to one or more networks.

To facilitate such communications, the wireless communication unit 110 may include one or more of a broadcast receiving module 111, a mobile communication module 112, a wireless Internet module 113, a short-range communication module 114, and a location information module 115.

The input unit 120 includes a camera 121 (or an image input unit) for an image or video signal input, a microphone 122 (or an audio input unit) for an audio signal input, and a user input unit 123 (e.g., a touch key, a push key, etc.) for receiving an input of information from a user. Audio or image data collected by the input unit 123 may be analyzed and processed into user's control command.

The sensing unit 140 is typically implemented using one or more sensors configured to sense internal information of the smart device, the surrounding environment of the smart device, user information, and the like. For example, the sensing unit 140 may include a proximity sensor 141 and an illumination sensor 142. If desired, the sensing unit 140 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 12a), the microphone 12b, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The smart device 100 disclosed in the present specification may be configured to utilize information obtained from the sensing unit 140, and in particular, information obtained from one or more sensors of the sensing unit 140, and combinations thereof.

The output unit 150 is typically configured to output various types of information, such as audio, video, tactile output, and the like. The output unit 150 may include a display unit 151, an audio output unit 152, a haptic module 153, and an optical output module 154. The display unit 151 may have an inter-layered structure or an integrated structure with a touch sensor in order to facilitate a touchscreen. The touchscreen may provide an output interface between the smart device 100 and a user, as well as function as the user input unit 123 which provides an input interface between the smart device 100 and the user.

The interface unit 160 serves as an interface with various types of external devices that can be coupled to the smart device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the smart watch 100 may perform assorted control functions associated with a connected external device, in response to the external device being connected to the interface unit 160.

The memory 170 is typically implemented to store data to support various functions or features of the smart device 100. For instance, the memory 170 may be configured to store application programs (or applications) run in the smart watch 100, data or instructions for operations of the smart device 100, and the like. Some of these application programs may be downloaded from an external server via wireless communication. Other application programs may be installed on the smart device 100 at time of manufacturing or shipping, which is typically the case for basic functions of the smart device 100 (for example, receiving a call, placing a call, receiving a message, sending a message, and the like). It is common for application programs to be stored in the memory 170, installed on the smart device 100, and launched by the controller 180 to perform operations (or functions) for the smart device 100.

The controller 180 typically functions to control overall operations of the smart device 100, in addition to the operations associated with the application programs. The controller 180 may provide or process information or functions appropriate for a user by processing signals, data, information and the like, which are inputted or outputted by the various components depicted in the above description, or running application programs stored in the memory 170.

Moreover, in order to launch an application program stored in the memory 170, the controller 180 can control at least one portion of the components described with reference to FIG. 1. Furthermore, the controller 180 controls at least two of the components included in the smart device 100 to be activated in combination to launch the application program.

The power supply unit 190 can be configured to receive external power or provide internal power in order to supply appropriate power required for operating elements and components included in the smart device 100. The power supply unit 190 may include a battery. In particular, the battery may include at least one of a built-in battery or a replaceable (or detachable) battery.

At least some of the above components may operate in cooperation with each other to implement operation, control, or a control method of a smart device according to various embodiments described below. Also, the operation, control, or control method of the smart device may be implemented on a smart device by executing at least one application program stored in the memory 170.

In the accompanying drawings, the smart device 100 is illustrated as having a body in the form of a bar. However, examples described in the present application are not limited thereto, and the smart device may have various structures and shapes. That is, the configuration and description of a specific type of the smart device 100 may be applied to other types of smart devices as well as to the specific type of the smart watch 100.

Figure 2:
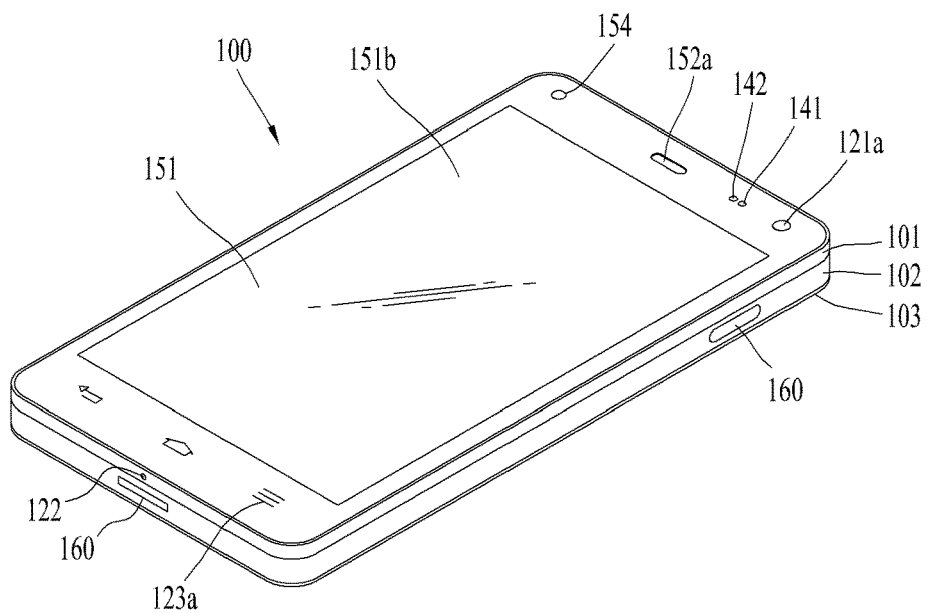
FIGS. 2 and 3 are perspective views showing an example of a smart device viewed from different sides.
Figure 3:
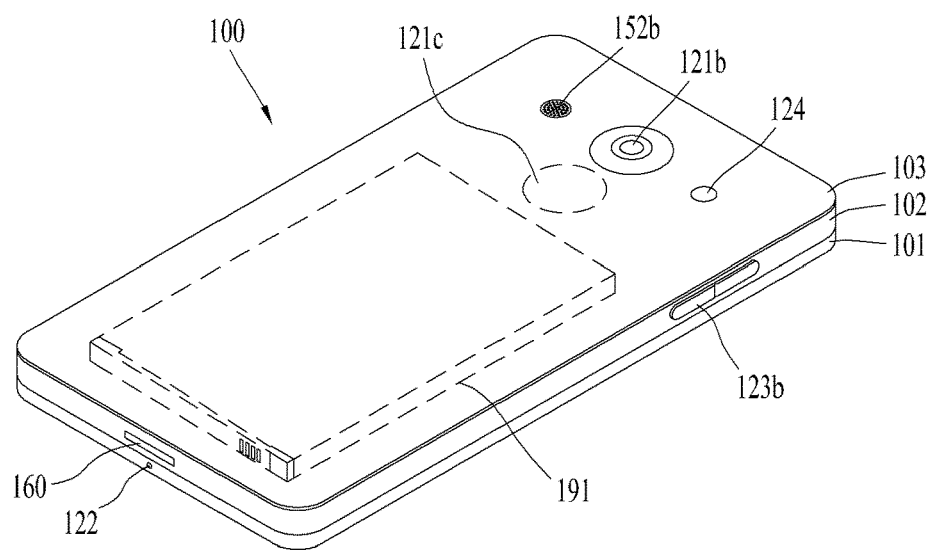

Following the general configuration of the smart device 100 described above, the structure of the smart device 100 is described with reference to relevant drawings. In this regard, FIGS. 2 and 3 are perspective views showing an example of a smart device viewed from different sides. More specifically, FIG. 2 is a perspective view showing the front portion of the smart device 100, and FIG. 3 is a perspective view showing the rear portion of the smart device 100. FIGS. 2 and 3 show the overall structure of the smart device 100, and therefore all descriptions are based on FIGS. 2 and 3, except when particularly referenced figures are referred to.

As described above, the smart device 100 has a body having a bar shape as a whole. The shape of the body may be varied as needed. Here, the body may be understood as a concept referring to the smart device 100 taken as at least one assembly.

The smart device 100 includes a case (e.g., a frame, a housing, a cover, etc.) that defines an appearance. As shown in the figures, the smart device 100 may include a front case 101 and a rear case 102. Various electronic components may be disposed in the internal space formed by coupling of the front case 101 and the rear case 102. The coupled cases 101 and 102 may also form the body, or the contour thereof. At least one middle case may be additionally disposed between the front case 101 and the rear case 102.

A display unit 151 may be disposed on the front surface of the smart device 100 to output information. As shown in the figures, the display unit 151 may be exposed to the outside of the front case 101 and thus may form the front surface of the smart device 100 together with the front case 101.

In some cases, electronic components may be mounted on the rear case 102 as well. The electronic components that may be mounted on the rear case 102 may include a detachable battery, an identification module, and a memory card. In this case, a rear cover 103 for covering the mounted electronic components may be detachably coupled to the rear case 102. Therefore, when the rear cover 103 is detached from the rear case 102, the electronic components mounted on the rear case 102 are exposed to the outside so as to be accessible.

As shown in the figures, when the rear cover 103 is coupled to the rear case 102, a part of the lateral surface of the rear case 102 may be exposed. In some cases, the rear case 102 may be completely covered by the rear cover 103 when coupled to the rear cover 103. The rear cover 103 may be provided with an opening for exposing a camera 121b and a sound output unit 152b to the outside.

These cases 101, 102 and 103 may be formed by injection molding of synthetic resin or may be formed of metal such as, for example, stainless steel (STS), aluminum (Al), titanium (Ti) or the like.

The smart device 100 may be configured such that one case provides the internal space, unlike the example above where a plurality of cases provides the internal space for accommodating various electronic components. In this case, a unibody smart device 100 in which synthetic resin or metal extends from the lateral surface to the rear surface may be implemented.

The smart device 100 may include a waterproof part (not shown) for preventing water from infiltrating the body of the smart device 100. For example, the waterproof part may include a waterproof member provided between the window 151a and the front case 101, between the front case 101 and the rear case 102, or between the rear case 102 and the rear cover 103 to seal the internal space when the window, the cases and the cover are coupled.

The smart device 100 may include a display unit 151, first and second sound output units 152a and 152b, a proximity sensor 141, an illumination sensor 142, a light output unit 154, first and second cameras 121a and 121b, first and second manipulation units 123a and 123b, a microphone 122, and an interface unit 160.

Hereinafter, a description will be given of the smart device 100 in which the display unit 151, the first sound output unit 152a, the proximity sensor 141, the illumination sensor 142, the light output unit 154, the first camera 121a and the first manipulation unit 123a are disposed on the front surface of the body, the second manipulation unit 123b, the microphone 122, and the interface unit 160 are disposed on the lateral surface of the body, and the second sound output unit 152b, and the second camera 121b are disposed on the rear surface of the body, as shown in FIGS. 2 and 3.

However, these elements are not limited to the aforementioned arrangement. These elements may be omitted or replaced with other ones as needed, or disposed on other surfaces. For example, the first manipulation unit 123a may not be provided on the front surface of the terminal body, and the second sound output unit 152b may be provided on the lateral surface of the terminal body rather than on the rear surface of the terminal body.

The display unit 151 displays (outputs) information processed in the smart device 100. For example, the display unit 151 may display execution screen information about an application program driven by the smart device 100, or user interface (UI) and graphic user interface (GUI) information according to the execution screen information. Further, as already mentioned above, when the smart device 100 is worn on the user's head using the auxiliary device, the display portion 151 may provide the user with a stereoscopic image for virtual reality.

The display unit 151 may include at least one of a liquid crystal display (LCD), a thin film transistor-liquid crystal display (TFT-LCD), an organic light-emitting diode (OLED) display, a flexible display, a 3D display, or an electronic ink (e-ink) display. The display unit 151 may include a display module (not shown) and a window 151a covering the display module. The display module may include a display element such as an LCD or an OLED as described above, and may be a component that actually displays image information. The window 151a may be disposed at a portion of the display module that is exposed to the user, and may protect the display module from the outside. In addition to this protection function, the window 151a should allow the information displayed on the display module to be seen by the user therethrough. Accordingly, the window 151a may be formed of a material having appropriate strength and transparency. The display module may be directly attached to the rear surface of the window 151a. The display module may be directly attached to the window 151 in various ways, and an adhesive may be most conveniently used for direct attachment.

In addition, two or more display units 151 may be provided depending on implementation of the smart device 100. In this case, the plurality of display units may be spaced apart from one another or integrally arranged on one surface of the smart device 100, or may be disposed on different surfaces of the smart device 100.

The display unit 151 may include a touch sensor (not shown) configured to sense a touch on the display unit 151 such that a control command may be received in a touch manner. The touch sensor may use at least one of various touch techniques such as a resistive touch technique, a capacitive touch technique, an infrared touch technique, an ultrasonic touch technique, and a magnetic field touch technique. As one example, as in the resistive touch technique and the capacitive touch technique, the touch sensor may be configured to convert a change in pressure applied to a specific portion of a touchscreen or a change in capacitance occurring at a specific portion of the touchscreen into an electrical input signal. The display unit 151 may configure a touchscreen as a kind of a touch input device in a smart device together with the touch sensor. The display unit 151 may display predetermined image information while operating as a touchscreen, which is a user interface. That is, the display unit 151 may function not only as the output unit 150 but also as the input unit 120. When the display unit 151 is touched, the touch sensor may sense the touch, and the control unit 180 may generate a control command corresponding to the touch based on the sensing. The content input in a touch manner may be a character or a number, or a menu item that may be indicated or designated in various modes.

The touch sensor may be configured in the form of a film having a touch pattern and disposed between the window 151a and the display module on the rear surface of the window 151a, or may be a metal wire directly patterned on the rear surface of the window 151a. Alternatively, the touch sensor may be integrated with the display module. For example, the touch sensor may be disposed on the substrate of the display module, or may be provided inside the display module.

In this way, the display unit 151 may form a touchscreen together with the touch sensor. In this case, the touchscreen may function as the user input unit 123 (see FIG. 1). If needed, a physical key (e.g., a push key) may be additionally arranged adjacent to the display unit 151, which may be a touchscreen, as the user input unit 123 for convenient input by the user.

The first sound output unit 152a may be implemented as a receiver for transmitting a call sound to a user's ear and the second sound output unit 152b may be implemented as a loud speaker for outputting various alarm sounds or multimedia playback sound.

The window 151a of the display unit 151 may be provided with a sound hole for emitting a sound generated from the first sound output unit 152a. However, the present invention is not limited thereto. The sound may be configured to be emitted along an assembly gap between the structures (for example, a gap between the window 151a and the front case 101). In this case, the appearance of the smart device 100 may become simpler because a hole independently formed for sound output is invisible or hidden from the outside.

The light output unit 154 is configured to output light for notifying a user of the occurrence of an event. Examples of the events may include message reception, call signal reception, a missed call, an alarm, a schedule notification, e-mail reception, and reception of information through an application. The control unit 180 may control the light output unit 154 to terminate light output when the event confirmation of the user is sensed.

The first camera 121a processes an image frame of a still image or a moving image obtained by the image sensor in the photographing mode or the video call mode. The processed image frame may be displayed on the display unit 151 and may be stored in the memory 170.

The first and second manipulation units 123a and 123b may be collectively referred to as a manipulating portion as an example of the user input portion 123 manipulated to receive a command for controlling the operation of the smart device 100. The first and second manipulation units 123a and 123b may be manipulated in any manner (tactile manner), such as touch, push, and scroll that provide a tactile sensation to the user. The first and second manipulation units 123a and 123b may be manipulated in a manner such as a proximity touch and a hovering touch that does not provide a tactile sensation to the user.

While the first manipulation unit 123a is illustrated as a touch key in the figures, the present invention is not limited thereto. For example, the first manipulation unit 123a may be configured as a push key (mechanical key) or a combination of a touch key and a push key.

Various contents may be set to be input through the first and second manipulation units 123a and 123b. For example, the first manipulation unit 123a may receive input of commands for a menu, a home key, cancel, a search, and the like, and the second manipulation unit 123b may receive inputs of commands such as adjustment of volume of sound output from the first or second sound output unit 152a or 152b and switch of the display unit 151 to a touch recognition mode.

The manipulation units 123a and 123b may include a touch input device having a structure similar to that of the touchscreen applied to the display unit 151 described above. Unlike the touchscreen, the manipulation units 123a and 123b may be configured to simply allow commands to be input therethrough without displaying image information, and the touch input device applied to the manipulation units may be called a touch pad.

A rear input unit (not shown) may be provided on the rear surface of the terminal body as another example of the user input unit 123. The rear input unit is manipulated to receive a command for controlling the operation of the smart device 100, and various input content may be set to be input. For example, commands such as power on/off, start, end and scrolling, adjustment of the volume of sound output from the first and second sound output units 152a and 152b, switch of the display unit 151 to the touch recognition mode and the like may be input through the rear input unit. The rear input unit may be implemented to allow input such as touch input, push input, or a combination thereof.

The rear input unit may be disposed to overlap the front display unit 151 in the thickness direction of the terminal body. For example, the rear input unit may be disposed at the upper end portion of the rear surface of the terminal body such that the user may easily manipulate the rear input unit when the user holds the terminal body with one hand. However, the present invention is not limited thereto, and the position of the rear input unit may be changed.

When the rear input unit is provided on the rear side of the terminal body as described above, a new type of user interface using the rear input unit may be realized. If at least a part of the functions of the first manipulation unit 123a provided on the front surface of the terminal body is replaced by the touchscreen or the rear input unit, and thus the first manipulation unit 123a is not disposed on the front surface of the terminal body, the display unit 151 may be configured with a larger screen.

The smart device 100 may include a fingerprint recognition sensor for recognizing a fingerprint of the user, and the controller 180 may use fingerprint information sensed through the fingerprint recognition sensor as an authentication means. The fingerprint recognition sensor may be embedded in the display unit 151 or the user input unit 123.

The microphone 122 may be configured to receive the user's voice and other sounds. The microphone 122 may be provided at a plurality of places to receive stereophonic sound.

The interface unit 160 serves as a path through which the smart device 100 is connected to an external device. For example, the interface unit 160 may be at least one of a connection terminal (e.g., a USB port) for connection with another device (e.g., an earphone, an external speaker), a port for short-range communication (e.g., an IrDA port, a Bluetooth port, a wireless LAN port, etc.), or a power supply terminal for supplying power to the smart device 100. The interface unit 160 may be implemented in the form of a socket for accommodating an external card such as a SIM (Subscriber Identification Module) card, a UIM (User Identity Module) card or a memory card for storing information.

A second camera 121b may be disposed on the rear surface of the terminal body. In this case, the second camera 121b has a photographing direction substantially opposite to that of the first camera 121a.

The second camera 121b may include a plurality of lenses arranged along at least one line. The plurality of lenses may be arranged in a matrix. This camera may be called an array camera. When the second camera 121b is configured as an array camera, images may be captured in various ways using a plurality of lenses, and a better quality image may be obtained.

The flash 124 may be disposed adjacent to the second camera 121b. The flash 124 shines light toward a subject when the subject is photographed with the second camera 121b.

The second sound output unit 152b may be additionally disposed on the terminal body. The second sound output unit 152b may implement a stereo sound function together with the first sound output unit 152a and may be used to implement a speakerphone mode during a call.

The terminal body may be provided with at least one antenna for wireless communication. The antenna may be embedded in the terminal body or formed in the case. For example, an antenna constituting a part of the broadcast reception module 111 (see FIG. 1A) may be configured to be drawn out from the terminal body. Alternatively, the antenna may be formed as a film type and attached to the inner surface of the rear cover 103, or a case including a conductive material may be configured to function as an antenna.

The terminal body may be provided with a power supply 190 (see FIG. 1A) for supplying power to the smart device 100. The power supply 190 may include a battery 191 built in the terminal body or detachably provided to the exterior of the terminal body.

The battery 191 may be configured to receive power through a power cable connected to the interface unit 160. In addition, the battery 191 may be configured to be wirelessly charged through a wireless charger. Wireless charging may be implemented by magnetic induction or resonance (magnetic resonance).

In the figures, the rear cover 103 may be coupled to the rear case 102 so as to cover the battery 191 to restrict release of the battery 191 and to protect the battery 191 from external impact and foreign substances. When the battery 191 is detachably attached to the terminal body, the rear cover 103 may be detachably coupled to the rear case 102.

Although not shown in FIGS. 2 and 3, the substrate may be installed in the cases 101 and 102, and various electronic components, especially various processors constituting the control unit 180, may be mounted on the substrate together with other circuits and devices assisting the same. The elements 110 to 190 shown in FIG. 1 may be directly installed on the substrate so as to be controllable by the control unit 180, or may be installed on or in the cases 101 and 102 and electrically connected to the substrate. For example, although exposed to the outside, the window 151 (i.e., the touch sensor) and the display module may each be connected to the substrate through wiring. Accordingly, the control unit 180 may be referred to by various names such as a controller and a control device, and may control all the elements of the smart device 100. Such controlled elements include not only the elements included in FIG. 1 but also other elements described below. Accordingly, the control unit 180 may be a practical element that appropriately performs a control method of the present application, which will be described later, by controlling the operations of the other elements. For this reason, all the detailed steps performed in the control method may be features of the control unit 180.

The smart device 100 may be provided with accessories to protect the exterior thereof or to supplement or extend the functionality of the smart device 100. One example of such accessories may be a cover or pouch that covers or accommodates at least one surface of the smart device 100. The cover or pouch may be operatively connected with the display unit 151 to extend the functionality of the smart device 100. Another example of the accessories may be a touch pen for supplementing or extending touch input to the touchscreen.

Figure 4:
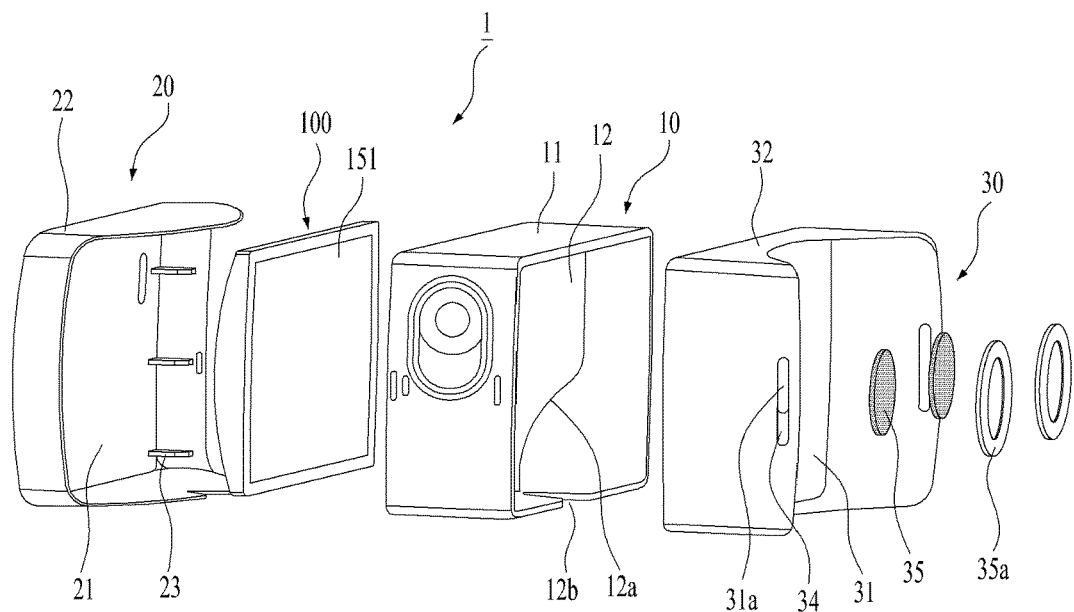
FIG. 4 is an exploded perspective view showing a head-mounted device, which is an accessory used together with a smart device.
Figure 5:
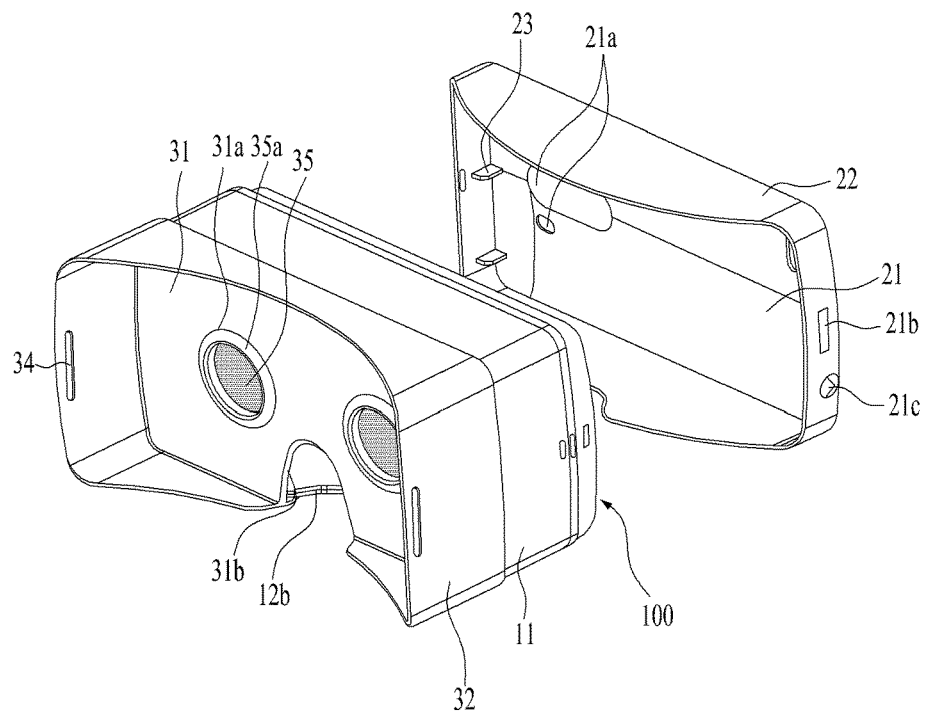
FIG. 5 is a perspective view showing the head-mounted device with a cover removed.
Figure 6:
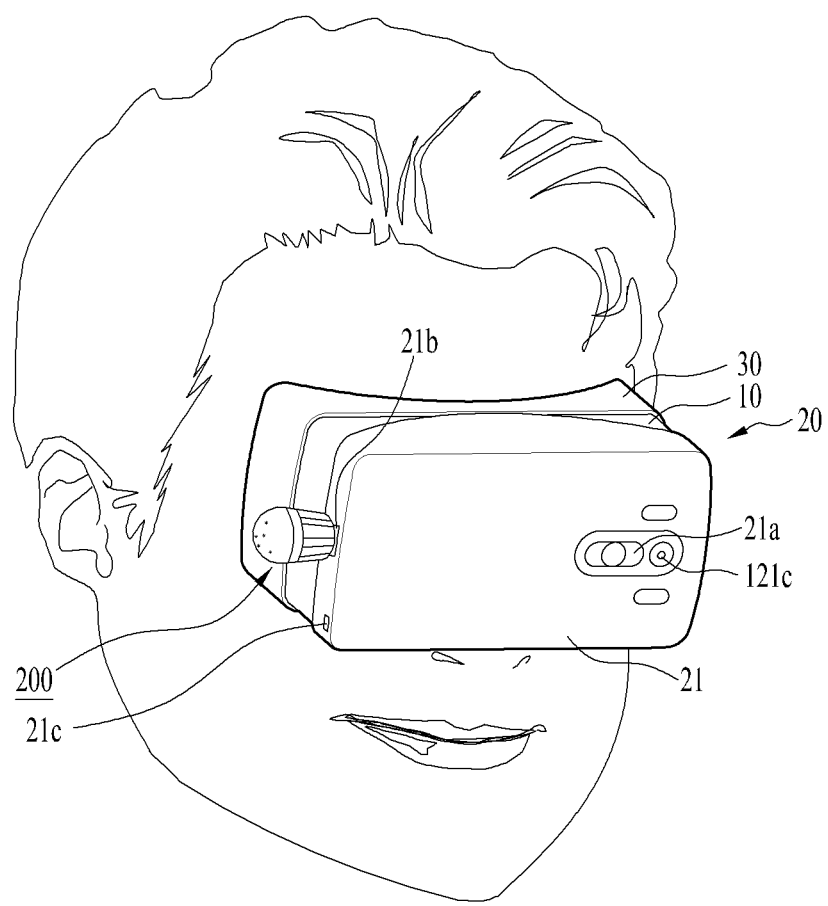
FIG. 6 is a perspective view illustrating a smart device worn by a user using a head-mounted device and an output device.
Figure 13:
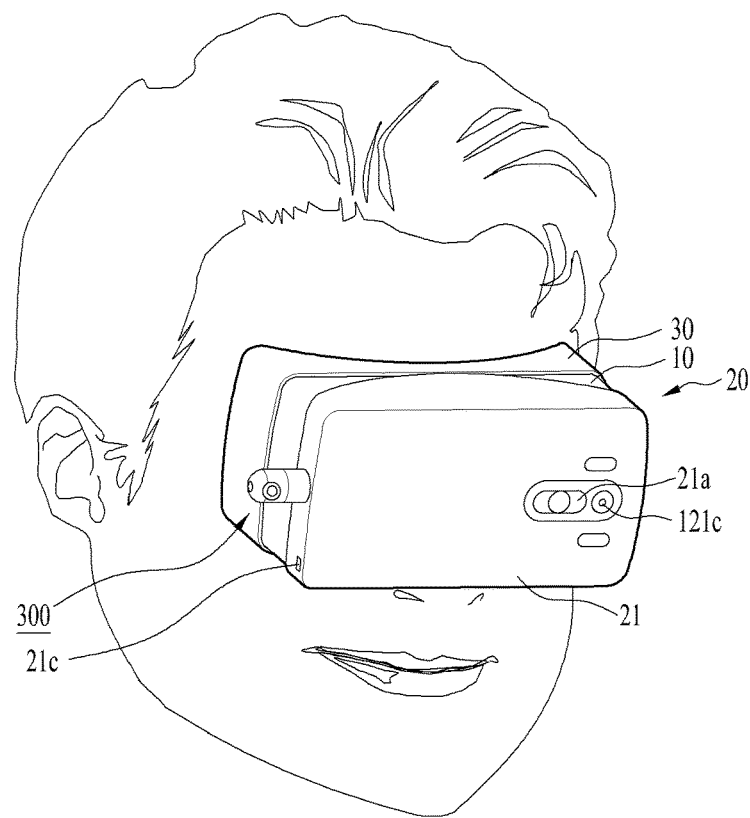
FIG. 13 is a perspective view showing a smart device worn by a user using a head-mounted device and a modified output device.
Figure 17:
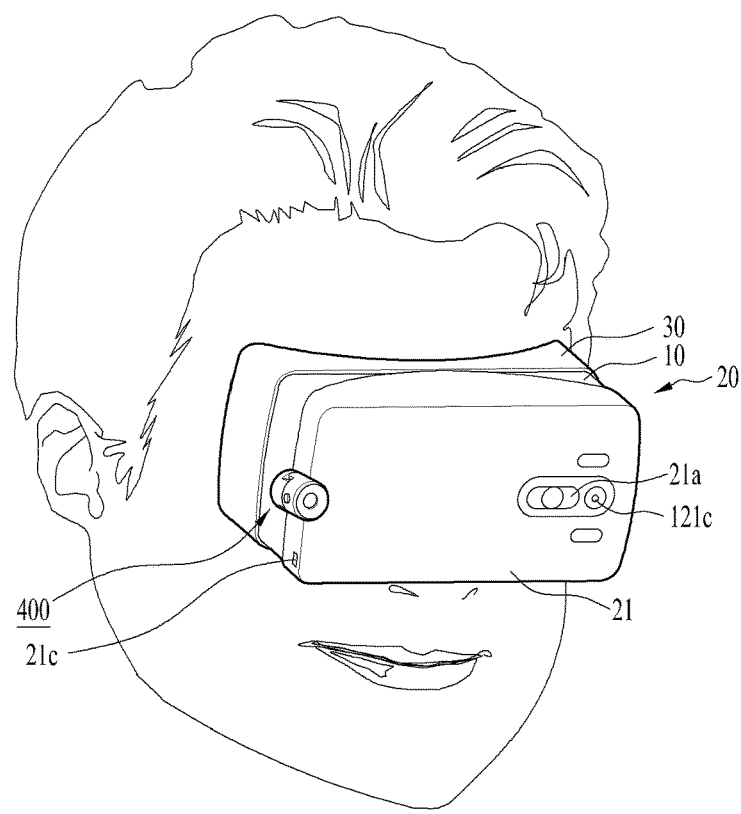
FIG. 17 is a perspective view illustrating a smart device worn by a user using a head-mounted device and a modified output device.

The smart device 100 may use an accessory as described above to provide the user with a stereoscopic image for virtual reality. The accessory may be worn on the head for convenience of the user, and the smart device 100 may be detachably mounted in the accessory. That is, the accessory may function substantially as an adapter for holding the smart device 100 on the user's head to provide virtual reality. In consideration of the function of holding the smart device 100 on the head, the accessory will be described as a head-mounted device in the following with reference to the related drawings. Since the head-mounted device 1 is integrated with the smart device 100 in terms of both structure and functionality, it may be substantially considered a part of the smart device 100 and not a separate device. FIG. 4 is an exploded perspective view showing a head-mounted device, which is an accessory used together with a smart device, and FIG. 5 is a perspective view showing the head-mounted device with a cover removed. For simplicity, the head-mounted device 1 will be referred to as a mounted device in the following description. FIGS. 6, 13 and 17 show the smart device 100 that is actually worn on the user's head along with the mounted device 1, and accordingly will be referred to along with FIGS. 4 and 5 in the following description of the mounted device 1.

Referring to FIG. 1, the mounted device 1 may have a body 10. Basically, the body 10 may have a hollow shape in order to allow the user to view stereoscopic images provided by the smart device 100 therethrough. That is, the body 10 may have open front and rear portions, and thus may form a hollow tube 11 as a whole. The body 10 may include a partition 12 for dividing the internal space of the body into left and right spaces. The partition 12 may separate the left and right fields of view of the user from each other by dividing the space inside the body 10. Therefore, the user may see the provided stereoscopic image more clearly. The partition 12 may also serve to reinforce the hollow body 10.

The mounted device 1 may be arranged around the user's eyes and brought into close contact with the user's face, in order to make the user concentrate on the provided stereoscopic images and to minimize infiltration of light interfering with viewing of the images into the device during use of the device. However, the nose protruding from the user's face may block the device from closely contacting the face. The mounted device 1, more precisely the body 10, may be configured to accommodate the user's nose. Thus, the body 10 may have a first seat 12a formed in the partition 12 to accommodate the user's nose. The body 10 may also have a second seat 12b formed in a lower portion thereof to accommodate the user's nose. The first and second seats 12a and 12b may be connected to each other and form a continuous seat for accommodating the user's nose. When the mounted device 1 is worn by the user using the first and second seats 12a and 12b, the user's nose is stably accommodated. Thus, the mounted device 1 may be brought into close contact with the user. Accordingly, the user may comfortably wear the device 1 and clearer images may be provided to the user.

The mounted device 1 may have a cover 20. The cover 20 may basically include a body 21. The body 21 may be formed of a plate-shaped member for supporting the rear surface of the smart device 100, as shown in FIG. 5, so as to stably support the smart device 100. The cover 20 may also have a flange 22 extending from the body 21. The flange 22 may basically assist the body 21 to stably support the smart device 100. The flange 22 may extend from the upper, lower, left and right sides of the body 21 and be arranged with the body 21 to allow the cover 20 to have a predetermined space for accommodating the smart device 100. The smart device 100 may be stably accommodated in the space of the cover 20 such that the rear surface of the smart device 100 is supported by the body 21 and the display 151 on which the stereoscopic image is displayed faces the user.

Since the smart device 100 displays stereoscopic images while being accommodated in the cover 20, the smart device 100, particularly the display unit 151 thereof, needs to be correctly aligned with the field of view of the user in order to provide a correct stereoscopic image to the user. Alignment may be obtained when the center of the smart device 100 is placed at the center of the cover 20, or more accurately, the center of the body 21. As such, the cover 20 may have a rib 23, as shown in FIGS. 4 and 5, to align the smart device 100 with the center of the cover 20. The rib 23 may be provided to the edge of the cover 20, more specifically, the body 21, and extend from the edge toward the inside of the cover 20 or the body 21. The rib 23 guides insertion of the smart device 100 into the cover 10 on both sides. Thus, when the smart device 100 is placed on the body 21, the smart device 100 may be positioned at the center of the cover 10 to be aligned with the user's line of sight.

As shown in FIG. 5, the cover 20 may include at least one opening 21a to 21c allowing operation of the various devices of the smart device 100 when the smart device is mounted in the device 1, that is, while the smart device is accommodated in the cover 20. Even when the smart device 100 is mounted in the mounted device 1, the smart device 100 needs to operate various devices thereof in relation to stereoscopic images or other functions. For example, such devices may include input devices such as a button, a switch and a microphone, output devices such as a speaker, a camera flash and an earphone jack, and a sensing device for sensing information about various surrounding environments. Considering the structure of the smart device 100 shown in FIGS. 2 and 3, the openings 21a of the body 21 may be provided for the second sound output unit 152b, the second camera 121b, and the flash 124, and the openings 21b and 21c of the flange 22 may be provided for the interface 160 and the earphone jack. The openings 21a to 21c may be formed at points where the corresponding devices are placed when the devices are accommodated in the cover 20. The user may operate the smart device 100 using the input devices through the openings 21a to 21c, the output devices may output predetermined information, and the sensing device may collect necessary information. Therefore, the mounted device 1 may allow the smart device 100 to perform other functions while providing stereoscopic images.

When the smart device 100, which is an independent device, is not used in the mounted device 1, the user should be allowed to use the smart device 100 to perform other functions. Thus, the smart device 100 should be able to be detached from the mounted device 1 whenever the user desires. For this reason, the element for mounting the smart device 100 may be configured to be detachable from the mounted device 1. That is, the cover 20 may be detachably provided on the body 10, specifically, the front portion thereof. To allow such detachment, various mechanisms may be used, for example, a projection and a groove to be coupled to each other may be employed.

Referring back to FIG. 4, the mounted device 1 may have goggles 30. Like other elements 10 and 20, the goggles 30 may include a body 31. The goggles 30 may include an optical device to deliver a stereoscopic image displayed on the smart device 100 to the user in a more appropriate state. More specifically, the goggles 30 may include openings 31a formed in the body 31. The openings 31a correspond to the left and right eyes of the user, respectively. The goggles 30 may also include left and right lenses 35 provided in the openings 31a, respectively. In addition, a gasket 35a may be provided between the lenses 35 and the openings 31a. The gasket 35a may catch the lens 35 to prevent the lens 35 from being separated from the body 31 and prevent light from leaking through a clearance between the lenses 35 and the openings 31a in order to allow the user to view the images with better quality. Due to such installation arrangement, when the user wears the device to view stereoscopic images, the lenses 35 are respectively placed on the user's eyes. Accordingly, as a kind of optical device, the lenses 35 may enlarge the stereoscopic image displayed on the display 151 of the smart device 100, and deliver the enlarged image to the user's eyeballs, thereby providing a better experience for the user in viewing the stereoscopic image. Further, if the smart device 100 provides a stereoscopic image requiring separate device such as polarizing glasses, the lenses 35 may be configured to perform the same function as that of the polarizing glasses as well as the enlarging function.

The goggles 30 may have a flange 32 extending from the body 31. The flange 32 may be a member that directly contacts the face of the user. Thus, the flange 32 may have a shape that matches the contour of the user's face to block light from infiltrating into the goggles to reach the eyes of the user. In addition, the mounted device 1 may be stably supported against the user's face by the flange 32. In addition, the nose protruding from the user's face may obstruct the device 1 from closely contacting the face when the user wears the mounted device 1. In addition to the body 10 described above, a device, more specifically, the goggles 30, may also be configured to accommodate the user's nose. More specifically, as shown in FIG. 5, the goggles 30 may have a first seat 31a formed in the body 31 to accommodate the user's nose. The seats 12a, 12b and 31a of the body 10 and the goggles 30 may be connected to each other to form a seat configured to accommodate the nose. Thus, the mounted device 1 may be brought into close contact with the user to provide an optimal stereoscopic image.

The goggles 30 may also include a holder 34 formed on the flange 32 to mount a strap or band (not shown). The holder 34 is formed as an opening and is provided on both sides of the flange 32. Although not shown, the strap may be fitted into the holder 34, and may be adjusted to fit the size of the user's head. Thus, using the strap, the device may be worn so as not to be separated from the head of the user. The strap may be fabricated to have a predetermined elasticity. In this case, the elastic strap may allow the device to be worn more stably on the user's head and to more closely contact the user's face.

The mounted device 1 described above is a kind of accessory used together with the smart device 100 and may basically allow the smart device 100 to be worn on the user's head. Further, the mounted device 1 may expand the stereoscopic image displayed on the smart device 1 and provide the expanded image to the user. Thus, the smart device 100 may be used together with the mounted device 1 to provide the user with enhanced virtual reality.

A typical function based on virtual reality, for example, movie watching or a typical application, may be appropriately performed by providing a stereoscopic image alone. However, some functions, such as gaming, additionally use active interaction between the provided stereoscopic images and the user, and accordingly continuous measurement of the user's motion, i.e., tracking of motion, may be required. In particular, the head motion of the user reflecting change in the user's gaze among the user's motions needs to be tracked in order to optimally provide virtual reality. Since the smart device 100 is worn on the user's head by the mounted device 1 and moved along with the head as described above, motion of the head may be tracked easily and accurately by tracking the motion of the smart device 1.

Although the smart device 100 may provide most of the functionality required for virtual reality, it does not track its own motion completely due to the limited functionality of the sensor. More specifically, the smart device 100 has a gyro sensor or an acceleration sensor capable of measuring motion or pose of the smart device within three-dimensional space. These sensors are capable of sensing translation within a limited range and rotation, but may not continuously sense translation beyond the range. On the other hand, the motion of the user's head usually involves continuous translational motion. Accordingly, the smart device 100 may not accurately track its motion and the motion of the user's head associated therewith by its own sensor alone, and thus may additionally include a separate mechanism for tracking.

Figure 7:
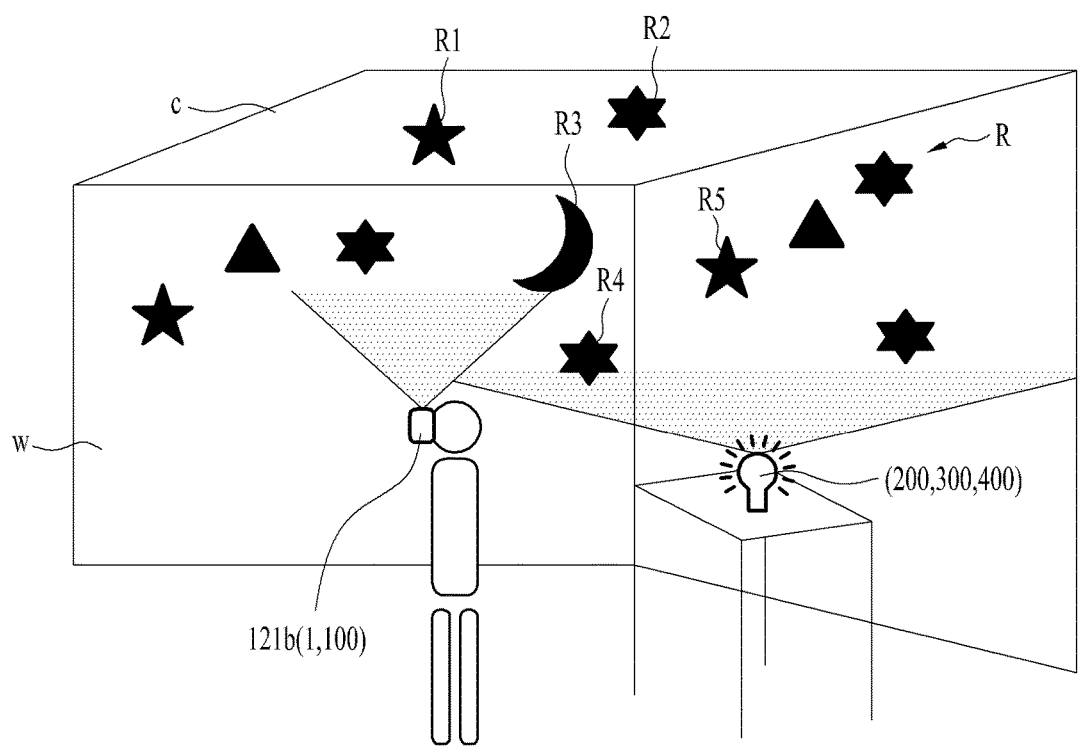
FIG. 7 is a conceptual diagram illustrating reference points emitted from an output device.
Figure 8:
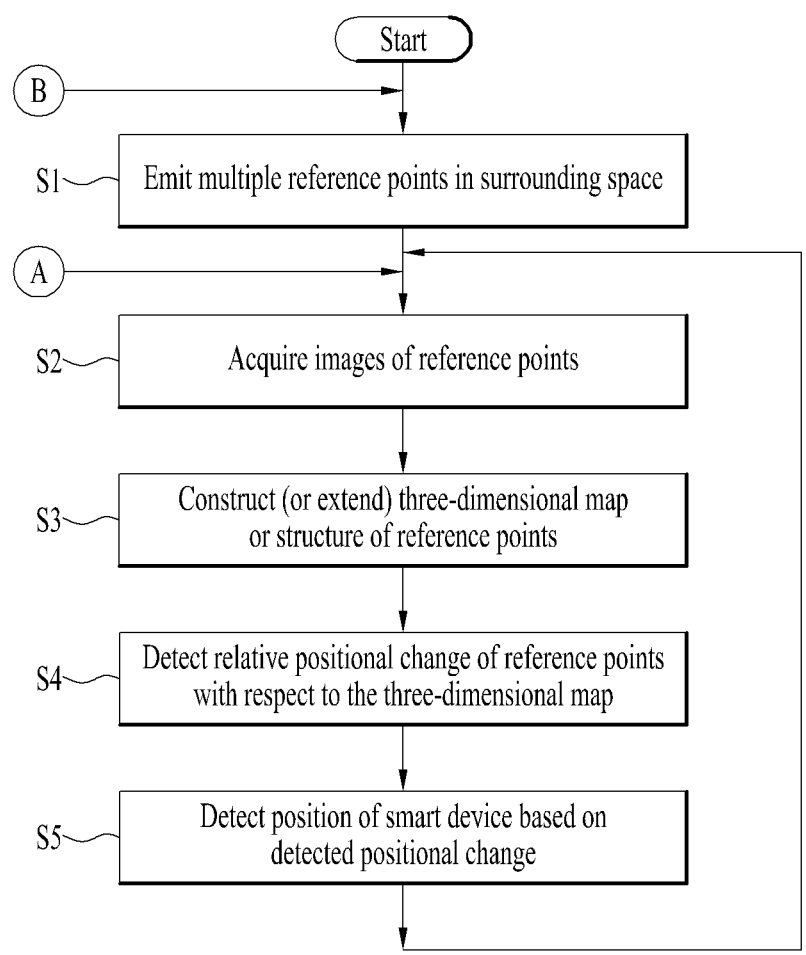
FIG. 8 is a flowchart illustrating a method for tracking motions of a smart device and a user's head.

FIG. 6 is a perspective view illustrating a smart device worn by a user using a head-mounted device and output device. FIG. 7 is a conceptual diagram illustrating reference points emitted from an output device. FIG. 8 is a flowchart illustrating a method for tracking motions of a smart device and a user's head. With reference to these figures, the tracking mechanism of the smart device 100 will be described in detail below. Since the smart device 100 is mounted using the mounted device 1, the smart device 100 and the user's head are moved together. Accordingly, the tracking mechanism may track the motion of the user's head by tracking the motion of the smart device 100, as previously described. Thus, tracking of motion of the smart device 100 by the tracking mechanism will be described below, and unless otherwise specifically stated, disclosure of tracking of motion of the device 100 corresponds to and should be regarded as disclosure of tracking the motion of the user's head. Further, the mounted device 1 is not detachably installed on the detachable smart device 100. Instead, the mounted device 1 may have a module that is integrated therewith and provides the same function as that of the device 100. In this case, the device may be an independent device specifically for virtual reality. For this independent virtual reality device, examples of all the tracking mechanisms described above and described below may be applied while maintaining the same technical concept without special modification.

First, as a tracking mechanism, the smart device 100 may include an output device 200, as shown in FIG. 6. The output device 200 may be configured to generate a plurality of reference points R. Further, as shown in FIG. 7, the output device 200 may be configured to provide the generated reference points R in a surrounding space thereof. More specifically, the reference points R provided in the surrounding space may be formed by predetermined light, and thus may travel a considerably long distance. Thus, as shown in FIG. 7, the reference points R may be projected onto the wall W and/or the ceiling C of the indoor space. Since the reference points R are actually emitted from the output device 200 to travel a long distance, the output device 200 may also be called an emitter.

The reference points R may utilize light from various light sources. Among these light sources, infrared light, particularly an infrared laser, has high coherency, and thus may allow the reference points R to be projected onto the wall W or the ceiling C without being distorted while traveling a long distance. In addition, since infrared light is invisible, the projected reference points R may not degrade the appearance of the indoor space or interfere with other activities in the indoor space. For these reasons, the reference points R may be formed by infrared light. Depending on such reference points R, the smart device 100 may measure change in position thereof and track the motion thereof based on such measurement, as described later. Therefore, considering this function, the reference points R may be called featured points or landmarks. Further, in order to correctly track the motion, the reference points R need to be easily recognized by the smart device 100, and thus may have a predetermined shape or pattern, as shown in FIG. 7. Furthermore, it may be desirable for the reference points R to be distinguished from each other in order to track change in position and track motion. Thus, the reference points R (or at least a part thereof) may have different patterns or shapes as shown in FIG. 7. The detailed structure and operation for emission of reference points will be described in more detail later.

Referring back to FIG. 6, the output device 200 may be detachably mounted on the smart device 100 or the body thereof. More specifically, the output device 200, i.e., the terminal thereof, may be inserted into the interface unit 160 of the smart device 100, which is installed in the mounted device 1 through the opening 21b of the cover 20. Through connection of the terminal and the interface unit 160, the output device 200 may be supplied with power and exchange data with the body of the smart device 100, specifically, with the control unit 180. If the output device 200 includes a separate battery, the battery may be charged by power supplied from the smart device 100 or the body thereof.

In addition, the output device 200 may emit reference points R from the smart device 100 or the mounted device 1, as shown in FIG. 7. That is, the output device 200 may emit reference points R while mounted on the smart device 100 or the mounted device 1, as also shown in FIG. 6. In this case, since the smart device 100 and the mounted device 1 are worn on the user's head, the output device 200 may also be described as emitting the reference points R directly from the user's head. However, as will be described later, the reference points R serve to provide a sort of reference for the moving smart device 100, that is, an invariable background, and accordingly the positions of the reference points R are preferably unchanged in order to detect and track change in position of the smart device 100. That is, the reference points R preferably remain fixed or stationary. If the output device 200 provides the reference points R while being mounted on the smart device 100, it may be difficult to provide fixed or stationary reference points R since it will move along with the smart device 100. Thus, the output device 200 first needs to be removed or detached from the smart device 100 so as not to move along with the smart device 100. For the same reason, the separated output device 200 must be stably positioned so as not to move in order to provide stationary reference points R. Thus, in all of the examples described below in this application, it is assumed that the output device 200 is operated when it is separated from the smart device 100 and placed at a remote location. For this reason, referring again to FIG. 7, the output device 200 may emit reference points R at a location remote from the smart device 100 or the mounted device 1. That is, the output device 200 may first be detached from the smart device 100 or the mounted device 1 and then disposed at a remote location appropriate to output the reference points R in the indoor space. For example, the output device 200 may be disposed at the center of the indoor space to emit uniform reference points R, or may be disposed at a higher position, such as a table. In addition, the separated output device 200 must take a proper pose to uniformly emit the reference points R in the space. Thus, the output device 200 may have a support for supporting the body thereof in a proper position. The output device 200 may be mounted on a separate cradle so as to be supported in a proper position. The output device 200 may be supplied with powered by the cradle during operation.

In the present application, the smart device 100 may have modified output devices 200 and 300 in addition to the output device 100 described above. Since the features of the output device 100 described above are general and common, the other output devices 200 and 300 may basically have the same features.

In addition, as a tracking mechanism, the smart device 100 may include a camera 121b, as shown in FIG. 6. The camera 121b may acquire the images of the provided reference points R. Since the smart device 100 is positioned in front of the user's eyes to provide a stereoscopic image, the line of sight of the camera 121b may be somewhat aligned with the line of sight of the eyes. Thus, the image acquired by the camera 121b may substantially correspond to the image viewed by the user. For this reason, the positional change of the reference points that may be detected in the obtained image may directly reflect the motion of the user's head. More specifically, since the front surface of the smart device 100, that is, the display unit 151, is oriented toward the user's eyes to provide images, the rear surface of the smart device 100 facing away from the display unit 151 may be relatively exposed to the outside. Therefore, the camera 121b disposed on the rear surface may be exposed to the outside through the opening 21a of the cover 20 to capture images of the reference points R. However, depending on the orientation of the smart device 100, the camera exposed to capture the images may be changed.

When the reference points R are formed by visible light, the camera 121b may be used without any special modification. However, if the reference points R are formed by infrared light, the camera 121b may be configured to photograph infrared reference points. For example, the camera 121b may further include a filter installed in front of the lens of the camera 121b to pass only infrared light. That is, by attaching such a filter to the front of the camera 121b, the images of the infrared reference points R may be captured without any additional structural change. The smart device 100 may further include a dedicated infrared camera 121c in the body thereof, as shown in FIG. 3. The infrared camera 121c may be embedded in the mounted device 1 or may be mounted on the smart device 100 using a separate accessory.

The output device 200 and the camera 121b may continuously provide reference points and continuously acquire images thereof while the smart device 100 is moving. Based on the acquired images, a change in position of the reference points and corresponding motion of the device 100 may be tracked by the smart device 100, more specifically, the control unit 180 thereof. Hereinafter, a method for tracking the motion using the reference points and the images thereof will be described in more detail with reference to FIG. 8. Since the control unit 180 substantially controls all the steps of FIG. 8 as mentioned above, the features of all the steps described below may be features of the control unit 180. In addition, as described above, the smart device 100 may have modified output devices 300 and 400 as well as the output device 200. The devices 300 and 400 may be may be applied to the tracking method described below in the same manner as the output device 200.

Referring to FIG. 8, the smart device 100 may first provide a plurality of reference points R in a surrounding space (S1). These reference points R may be actually emitted from the output device 200 of the smart device 100 and be projected onto the wall W or the ceiling C of the surrounding space. The reference points R may have specific patterns or shapes to be easily recognized by the smart device 100 or controller 180 in the steps after the providing step S1. In addition, at least some of the reference points R may have different shapes or patterns such that they may be distinguished from each other. Furthermore, the output device 200 may emit the reference points R from the smart device 100 or the mounted device 1. Preferably, however, the output device 200 may emit the reference points R at locations remote from the smart device 100 or the mounted device 1, as described in detail above. Since the reference points R provide a reference for motion tracking of the smart device 100 in the following steps, the providing step S1 may be continuously performed while the motion is generated and tracking is performed. That is, the same reference points R may be continuously emitted in the surrounding space while the head motion is generated and tracking thereof is performed.

After the providing step S1, the smart device 100 may acquire images of the reference points R (S2). In the acquiring step S2, the images may be actually captured by the camera 121b. As described above, since the line of sight and the viewing angle of the camera 121b substantially match the line of sight and viewing angle of the user, the images obtained by the camera 121b may be substantially identical to the images viewed by the user. Due to this identity, the motion of the smart device 100 may be matched to the motion of the user's head. Further, in order to track the motion of the smart device 100 in subsequent steps, change in position of the smart device 100 must be continuously detected. To this end, images reflecting the current position of the smart device 100 may be continuously required. Accordingly, the acquiring step S2 may be continuously performed while the motion is generated and tracked. That is, different images may be continuously acquired while the head motion occurs and tracking is performed.

The smart device 100 may then construct a three-dimensional map or a three-dimensional structure of predetermined reference points from the acquired images (S3). The three-dimensional map or structure of the reference points obtained in the constructing step S3 may be used as a kind of background or reference for determining change in position of the reference points R. However, it may be inefficient to obtain a three-dimensional map or structure for all the reference points. Therefore, as shown in FIG. 7, a three-dimensional map or structure for a predetermined number of reference points R1 (for example, five points) may be obtained. Substantially, in the constructing step, the smart device 100 may select a limited number of images, i.e., key frames, from among a plurality of acquired images in consideration of calculation efficiency. The positions of the reference points R1-R5 are calculated from the key frames using a method such as triangulation. Finally, a three-dimensional map or structure may be constructed using this position information.

Once the three-dimensional map or structure is constructed, the smart device 100 may continuously detect change in positions of the predetermined number of reference points with respect to the three-dimensional map or structure (S4). As described above, since the line of sight of the camera 121b is somewhat coincident with the line of sight of the user's eyes, the relative positions of the reference points R in an image obtained by the camera 121b are substantially identical to the relative positions actually shown to the user. Therefore, positional change of the predetermined reference points R1 to R5 may have a direct correlation with positional change of the user's head as well as positional change of the smart device 100 having the camera 121b. Therefore, in order to detect change in position of the smart device 100, change in positions of a predetermined number of reference points R1 to R5 may be detected. More specifically, acquired images may be compared with a three-dimensional map or structure that is continuously constructed. Through this comparison, whether the positions of the reference points R1 to R5 in the image have changed with respect to the reference points R1 to R5 in the three-dimensional map or structure may be detected. Such comparison and detection may be continuously performed, and positional change of the reference points R1 to R5 may be continuously obtained.

Therefore, based on the detected positional change, the smart device may continuously detect the position thereof (S5). More specifically, based on the positional change of the reference points R1 to R5 detected by direct correlation between the reference points and the position of the smart device 100, change in position of the smart device 100 may be detected. For the same reason, the detected positional change of the smart device 100 may represent a relative position of the smart device 100 with respect to a specific start position (i.e., a position within the three-dimensional map). Accordingly, the position of the smart device 100 may be detected in each image based on the positional change of the detected reference points R1 to R5. Further, in accordance with the correlation described above, the detected position of the smart device 100 may be matched directly to the position of the user's head.

As shown in FIG. 8, while the motion of the smart device 100 occurs and tracking is performed, the providing step S1 may continuously provide the same reference points R, but steps S2 to S5 may be continuously repeated to calculate the changing position information for motion tracking. Thus, the positions of the smart device 100 and the user's head may be continuously detected, and the smart device 100 and the user's head may be tracked based on these positions. In the iterative loop of steps S2 to S5, unlike the other steps, the constructing step S3 may not be repeated each time an image is acquired (S2) since it is a step of forming a background. However, if motion of the smart device 100 occurs beyond the range of the previously constructed three-dimensional map or structure, the acquired image and the three-dimensional map may not be properly compared with each other. Accordingly, in this case, the three-dimensional map or structure may be extended (S3). More specifically, new or additional reference points R1 to R5 may be selected from the acquired image according to the extended range of motion of the smart device 100 and a three-dimensional map or structure may be constructed through the same steps as described above.

The sensors in the smart device 100, for example, gyro sensors or acceleration sensors, cannot continuously detect and track the motion, in particular, the translational motion, of the smart device 100. However, these sensors may detect whether or not the translational motion has occurred by simply sensing the translational motion within a limited range. Accordingly, when the smart device 100 detects occurrence of the motion, in particular, the translation motion using these sensors, it may perform the tracking procedure from the providing step S1 to the other steps S2-S5. In addition, since the sensors are capable of detecting the motion, particularly the translational motion, within the limited range, the above-described tracking procedure may be started when the motion, that is, the translational motion, occurs beyond the predetermined range. If the positional change of the reference points R1 to R5 is not detected for a predetermined time in steps S4 and S5 during the tracking procedure, the tracking procedure may be automatically terminated.

Figure 9:
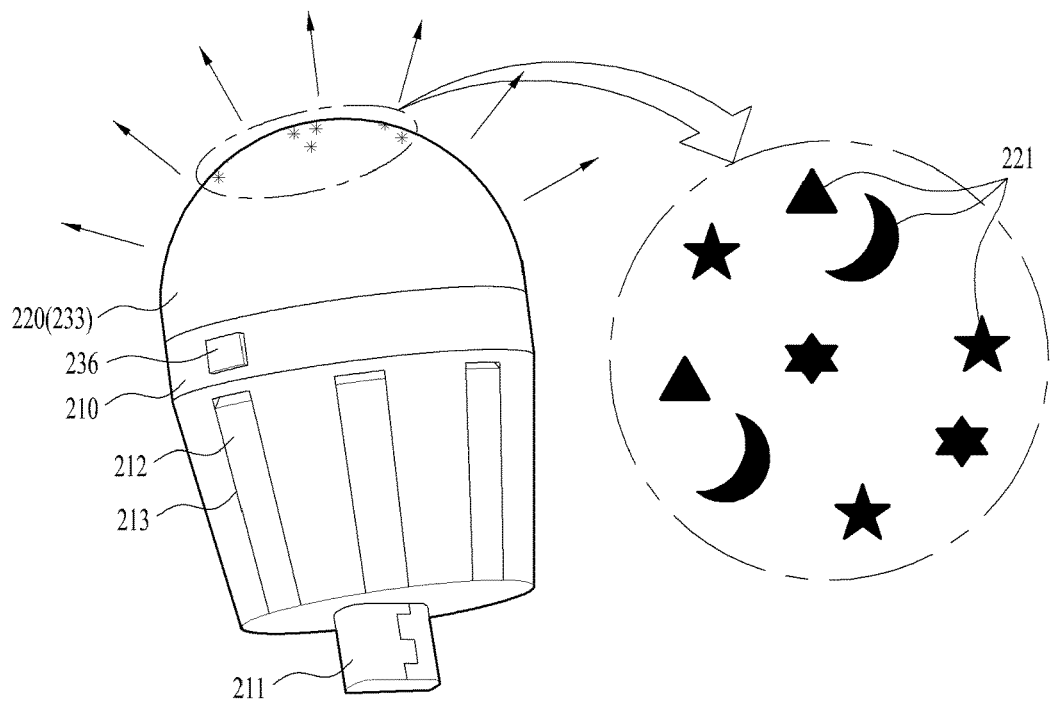
FIG. 9 is a perspective view showing an output device mounted on a smart device.
Figure 10:
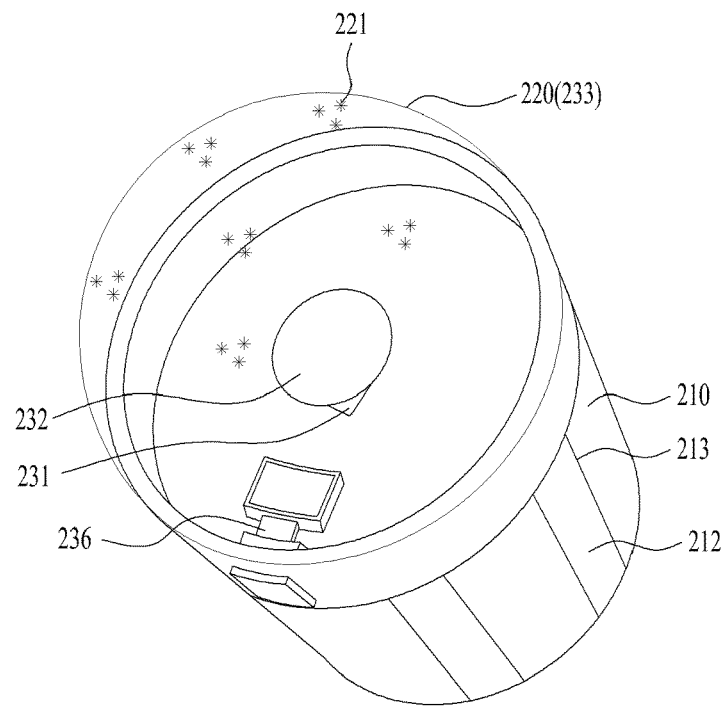
FIG. 10 is a perspective view showing the structure of the output device.
Figure 11:
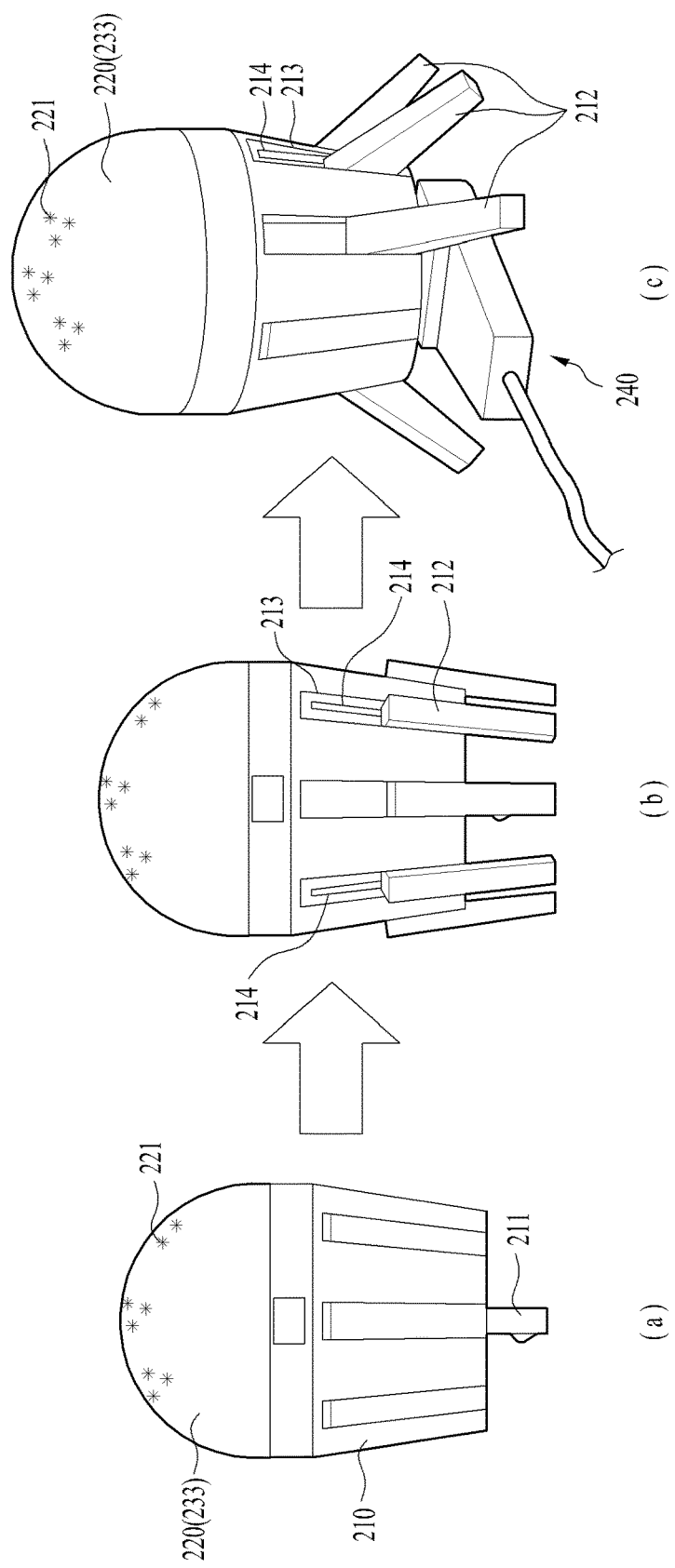
FIG. 11 is a perspective view showing extendable legs or fins of the output device.
Figure 12:
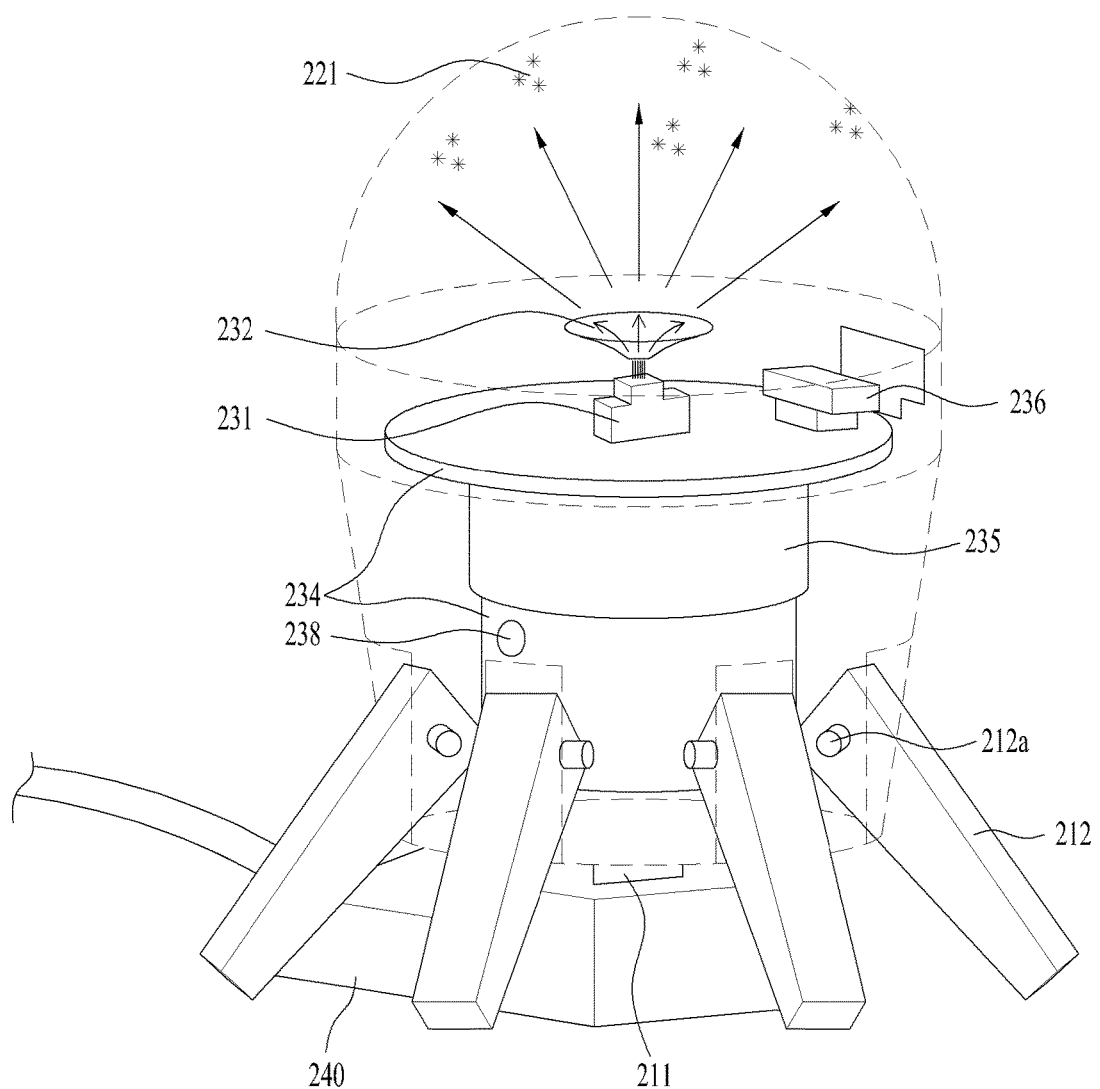
FIG. 12 is a perspective view showing the output device mounted on a separate cradle.

Following this tracking method, the detailed structure and operation of the output device 200 will be described below for better understanding of the examples of the present application. In this regard, FIG. 9 is a perspective view showing an output device mounted on a smart device, and FIG. 10 is a perspective view showing the structure of the output device. FIG. 11 is a perspective view showing extendable legs or fins of the output device, and FIG. 12 is a perspective view showing the output device mounted on a separate cradle.

In terms of structure, the output device 200 may include a body 210 and a head 220, which is coupled to the body 210. The body 210 may be connected to the smart device 100 or the body thereof. For this connection, the output device 200, i.e., the body 210, may have a terminal 211, which may be inserted into the interface unit 160 of the smart device 100. The head 220 is configured to emit a plurality of reference points R. Thus, the head 220 and the body 210 may form an internal space for accommodating various components that create the reference points R.

In terms of functionality for generating a plurality of reference points R, the output device 200 may include a light source 231 and a converter. The light source 231 may be configured to emit an infrared laser, in consideration of coherency and invisibility as mentioned above. As the light source 231, an infrared laser diode may be employed as a representative example among various components which may be employed. The converter may be configured to convert infrared laser emitted from the light source 231 into the plurality of reference points R. The converter may include a diffusing member 232 configured to uniformly disperse the emitted infrared laser, as shown in the figures. For example, the diffusing member 232 may be formed of an opaque member which is advantageous in dispersing the laser. In addition, the output device 200, more specifically, the converter, may include a filter 233 that selectively passes the infrared laser dispersed by the diffusion member 232. As shown, the head 220 may be formed to have an internal space sufficient to allow the infrared laser having passed through the diffusing member 232 to be more uniformly dispersed, and may selectively pass the dispersed laser. Therefore, the head 220 may be formed of a dome-shaped member and may function as the filter 233 at the same time. The filter 233 (i.e., the head 220) may have a plurality of openings, holes, or slits 221 for selective passing the laser. The openings 221 may have a predetermined shape or pattern that is easily identified by the smart device 100, and the laser passing through the openings 221 may have this shape and pattern. Further, different patterns may be provided such that the generated reference points R are distinguished from each other. Furthermore, the openings 221 may be formed throughout the filter 233 for uniform emission of the reference points R.

More specifically, the light source 231 may be disposed below the diffusing member 232, and the filter 233 may be disposed above the diffusion member 232 with sufficient spacing from the diffusing member 231. The diffusing member 232 may have a portion for laser emission wider than a portion onto which the laser is incident so as to facilitate dispersion. For example, the diffusing member 232 may be an inverted conical member, as shown in the figures. The infrared laser emitted from the light source 231 may be dispersed while passing through the diffusing member 232, and the laser having passed through the diffusing member 232 may be more uniformly dispersed while traveling from the diffusing member 232 to the filter 233. The filter 233 may pass the dispersed laser only through the openings 221, and thus the laser that is dispersed while passing through the openings 221 may be converted into a plurality of reference points R. In addition, the laser dispersed through the filter 233 may have a predetermined pattern according to the pattern of the openings 221. Further, since the filter 233 is a dome-shaped member having uniformly dispersed openings 221, the reference points R may be emitted throughout 180 degrees, and the reference points R may be uniformly distributed in the surrounding space, as shown in FIG. 9.

As clearly shown in FIG. 12, the output device 200 may include a substrate 234 on which various electronic components for controlling the operation of the output device are mounted. The output device 200 may also have a switch 236 installed on the substrate 234. The output device 200 may be operated or stopped by manipulating the switch 236. The output device 200 may be operated or stopped using the terminal 211. For example, the smart device 100 may generate a signal for controlling the operation of the output device 200, which may be transmitted to the output device 200 via the terminal 211 to control, i.e., operate or stop, the output device 200. In addition, since the terminal 211 is electrically connected to the smart device 100, i.e., the interface unit 160, connection and disconnection between the terminal 211 and the smart device 100 may trigger different electrical signals. Accordingly, the operation and stop of the output device 200 may be controlled using signals generated at the time of connection and disconnection. For example, when the output device 200 that is turned on is mounted on the smart device 100, the output device 200 may be immediately turned off. On the other hand, when the output device 200 in the off state mounted on the smart device 100 is removed from the smart device 100, the output device 200 may be turned on immediately so as to emit the reference points R at the remote locations. The output device 200 may include a battery 235 for supplying power to other components. The battery 235 may be charged by the smart device 100 or other power sources via the terminal 211. Thus, the output device 200 may operate using the battery 235 even when removed from the smart device 100. The components 234 to 236 described above may all be accommodated in the body 210 and the head 220.

The output device 200 may generate a lot of heat since many electronic components are integrated within a small area. Accordingly, the output device 200 may further include fins 212 as a heat dissipating structure. As shown in FIG. 11, the fins 212 may be configured to contractively extend from the output device 200. Accordingly, the output device 200 may have a compact appearance while having a heat dissipating structure. More specifically, the output device 200 may include a recess 213 formed in the body 210, and the fins 212 may be accommodated in the recess 213. The output device 200 may also include a groove 214 formed along the sidewall of the recess 213, and the hinge shaft 212a of the fin 212 (see FIG. 12) may be inserted into the groove. Thus, the fin 212 may be movably installed in the output device 200 due to movement of the hinge shaft 212a along the groove 214. This coupling structure may enable the fin 212 to move within the recess 213 when the hinge shaft 212a moves along the groove 214, as shown in FIG. 11(b). As the groove 214 extends downward, the fin 212 may also move in the same direction and thus protrude from the output device 200 as shown in the figure. Thus, the protruded fins 212 may support the output device 200, and accordingly the output device 200 may operate stably at a location remote from the smart device 100 without a separate cradle. Since the protruded fins 212 substantially increase the surface area of the output device 200, the output device 200 may be cooled. Further, to boost the cooling effect, the protruded fins 212 may be further extended from the output device 200, as shown in FIG. 11(c). Actually, the fins 212 may be radially expended from the output device 200, i.e., the body 210. Accordingly, since the heat dissipation area may be further increased and more smoothly contact ambient air, the fins 212 may cool the output device 200 more effectively. When unfolded, the fins 212 do not interfere with other components proximate to the bottom of the output device 200. Accordingly, the output device 200 may be mounted on the cradle 240 with the fins 212 unfolded. The modified output devices 300 and 400, which will be described later, may also have such fins 212, and the description given above and the related drawings may be equally applied to the modified output devices 300 and 400.

Figure 14:
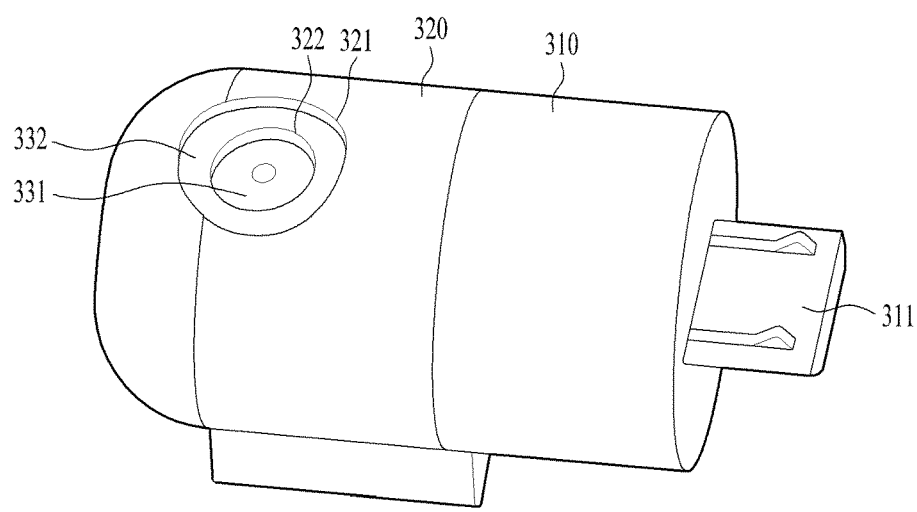
FIG. 14 is a perspective view showing the modified output device.
Figure 15:
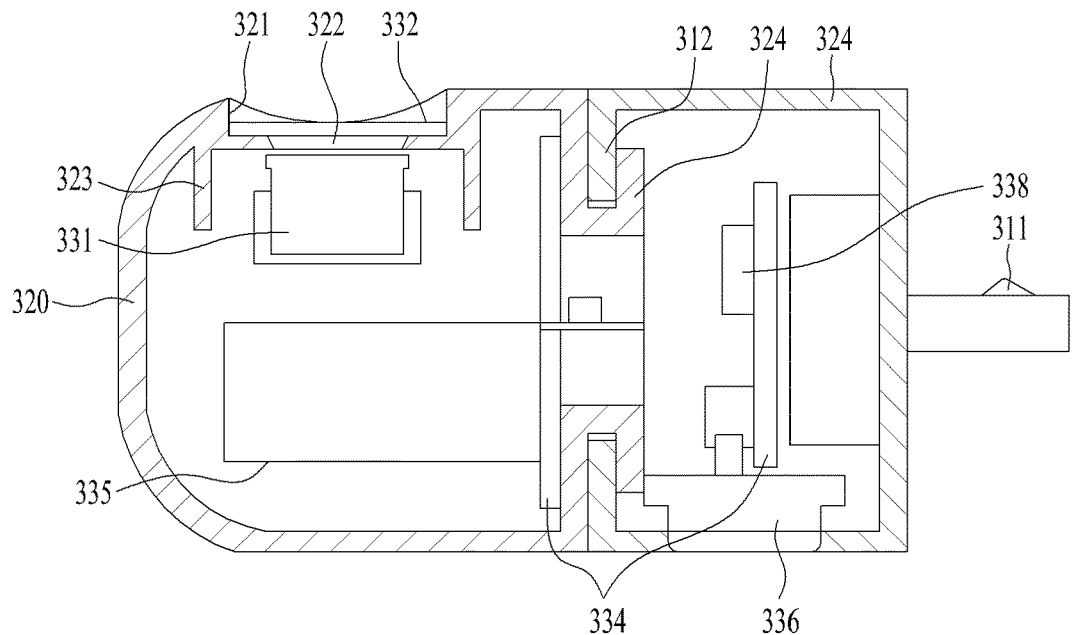
FIG. 15 is a cross-sectional view showing the modified output device.
Figure 16:
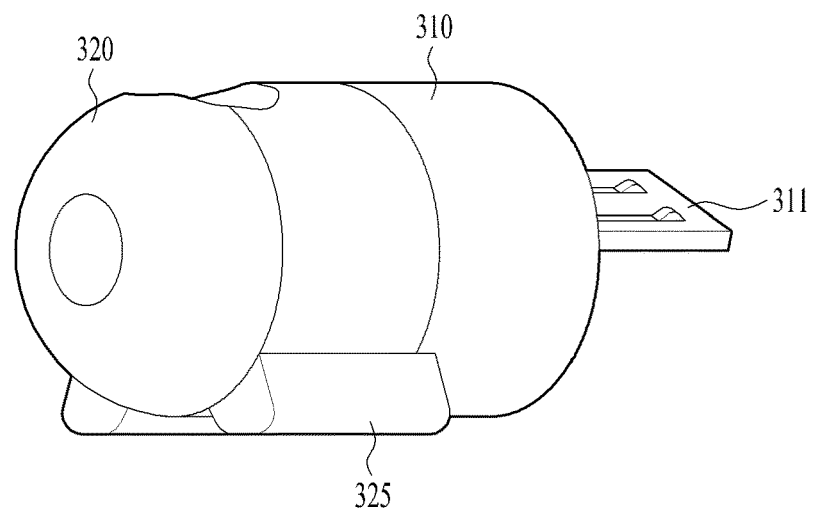
FIG. 16 is a perspective view showing the modified output device disposed on the floor.

The smart device 100 may further include modified output devices 300 and 400 in addition to the output device 200. These devices 300 and 400 may be distinguished from the output device 200 in terms of the method of converting the infrared laser into reference points R. The output device 300 between these modified output devices will be described in detail below with reference to the related drawings. FIG. 13 is a perspective view showing a smart device worn by a user using a head-mounted device and a modified output device, and FIG. 14 is a perspective view showing the modified output device. FIG. 15 is a cross-sectional view showing the modified output device, and FIG. 16 is a perspective view showing the modified output device disposed on the floor.

In terms of structure, the output device 300 may include a body 310 and a head 320 coupled to the body 310, as in the case of the output device 200. The body 310 may be connected to the smart device 100 or the body thereof. For this connection, the output device 300, i.e., the body 310, may have a terminal 311, which may be inserted into the interface unit 160 of the smart device 100. The head 320 is configured to emit a plurality of reference points R. Thus, the head 320 and the body 310 may form an internal space for accommodating various components that create the reference points R.

In terms of functionality, the output device 300 may include a light source 331 and a converter. The light source 331 may be configured to emit an infrared laser, in consideration of coherency and invisibility, and an infrared laser diode may be used as the light source 331. The converter may be configured to convert the infrared laser emitted from the light source 331 into the plurality of reference points R. More specifically, the converter may include a diffractive optical element (DOE) lens 332. The DOE lens 332 may have a plurality of microstructures formed on the surface thereof or formed therein. The microstructures may have a predetermined profile and the infrared laser incident on the lens 332 may be diffracted by this profile. By appropriately designing the microstructures, the incident laser may be diffracted in a desired direction. Furthermore, the plurality of microstructures may simultaneously form a plurality of reference points while diffracting the laser in a desired direction. Accordingly, the DOE lens 332 may diffract the incident laser from the light source 331 to form a plurality of reference points emitted in desired directions.

More specifically, as shown in FIGS. 14 and 15, the head 320 may include a seat 321 formed on an outer circumferential surface thereof. The seat 321 may be formed in the form of a recess, and the DOE lens 332 may be inserted into the seat 321. The head 320 may include an aperture 322 formed in the bottom of the seat 321. The head 320 may have a bracket 323, which is formed at the bottom of the seat 321. The bracket 323 may be configured to accommodate the light source 331. The bracket 323 extends from the bottom of the seat 321 to the inside of the head 320 and may be formed to surround the light source 331. The light source 331 may be supported by the bracket 323 so as to face the lens 332, and the aperture 322 may be interposed between the light source 331 and the lens 332. The infrared laser emitted from the light source 331 may be incident on the DOE lens 332 through the aperture 322. The incident laser may be, diffracted in predetermined directions by the microstructures in the lens 332. The diffracted laser may be converted into a plurality of reference points R, and the reference points R may be uniformly distributed in the surrounding space.

Referring to FIG. 15, the output device 300 may include a substrate 334 on which various electronic components for controlling the operation of the output device are mounted. The output device 300 may also have a switch 336, which is mounted on the substrate 334, and the output device 300 may be operated or stopped by operating the switch 336. The output device 300 may be operated or stopped using the terminal 311. Control of the operation and stopping of the output device 300 using the switch 336 and the terminal 311 has already been described in detail in relation to the output device 200. Thus, the description of the output device 200 in relation to operation and stopping is referred to, and further description will be omitted. The output device 300 may include a battery 335 for supplying power to other components. The battery 335 may be charged by the smart device 100 or other power sources via the terminal 311. Thus, the output device 300 may operate using the battery 335 even when removed from the smart device 100. The components 234 to 236 described above may all be accommodated in the body 310 and the head 320.

Furthermore, the output device 300 may include a mechanism capable of adjusting the orientation of the output device so as to accurately emit reference points R within the viewing angle of the user/camera 121b. In addition, since the head 320 in the output device 300 emits the reference points R, the adjustment mechanism may be configured to adjust the orientation of the head 320. Referring to FIG. 15, the output device 300 may include a first flange 312, which is formed on the body 310, and a second flange 324, which is formed on the head 320 and engaged with the first flange 312, as the adjustment mechanism. The second flange 324 may be formed to at least partially surround the first flange 312 as shown in the figures. More specifically, the second flange 324 may have a bent portion, into which the first flange 312 may be inserted. The first flange 312 may not be separated from the second flange 324 22 due to such coupling, and a bearing surface may be formed between the first flange 312 and the second flange 324. Thus, the head 320 may be rotated about the central axis of the output device 300 or the head 320 while being guided by the bearing surface between the first flange 312 and the second flange 324. By this rotation, the head 320 may adjust the orientation thereof and emit the reference points R in the correct directions. In addition, as shown in FIG. 16, the output device 300 may have a pair of legs 325, which are formed in the head 320, as a support mechanism. The legs 325 may extend a long distance along the central axis of the head 320 and may be spaced apart from each other by a predetermined distance. Therefore, the output device 300 may be stably supported by the legs 325 at a location remote from the smart device 100 even without a separate cradle. In addition, the legs 325 may extend over body 310 to ensure more stable support.

Figure 18:
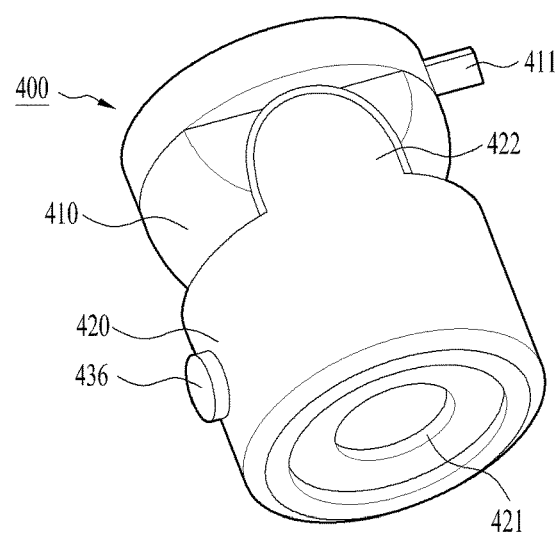
FIG. 18 is a perspective view showing the modified output device.
Figure 19:
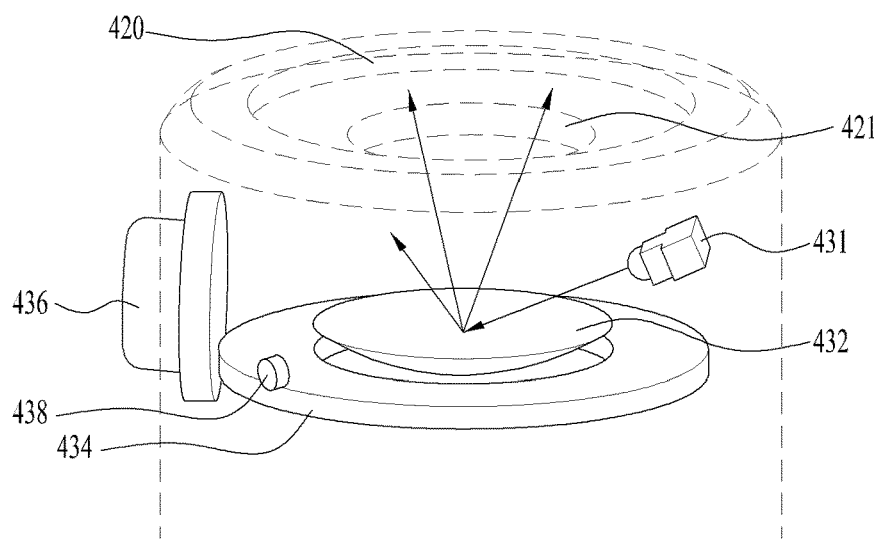
FIG. 19 is a perspective view showing in detail the conversion structure of the modified output device.
Figure 20:
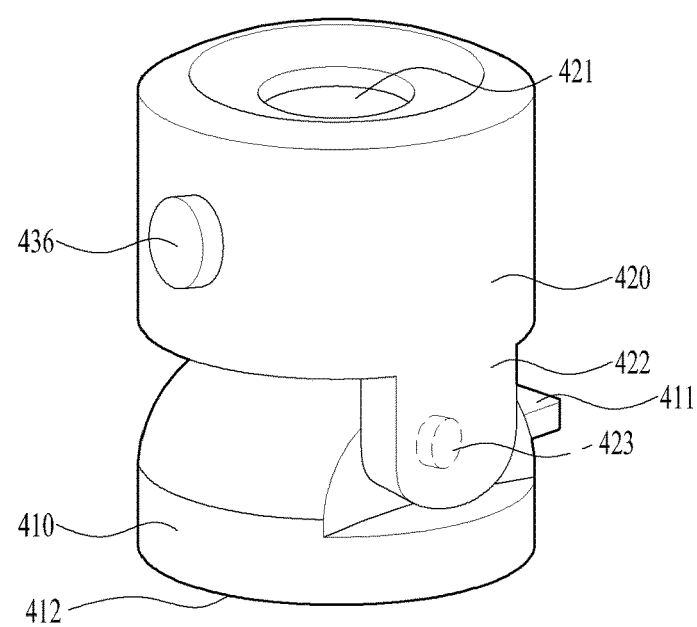
FIG. 20 is a perspective view showing the modified output device disposed on the floor.

Following the description of the output device 300, the output device 400 of the modified output devices will be described in detail below with reference to associated drawings. FIG. 17 is a perspective view illustrating a smart device worn by a user using a head-mounted device and a modified output device, and FIG. 18 is a perspective view showing the modified output device. FIG. 19 is a perspective view showing the conversion structure of the modified output device in detail, and FIG. 20 is a perspective view showing the modified output device disposed on the floor.

Referring to FIGS. 17 and 18, in terms of structure, like the output devices 200 and 300, the output device 400 may include a body 410 and a head 420 coupled to the body 410. The body 410 may be connected to the smart device 100 or the body thereof. For this connection, the output device 400, the body 410, may have a terminal 411. The terminal 411 may be inserted into the interface 160 of the smart device 100. The head 420 is configured to actually emit a plurality of reference points R. The head 420 and the body 410 may thus form an internal space for accommodating various components that create the reference points R.

In terms of functionality, as shown in FIG. 19, the output device 400 may include a light source 431 and a converter. The light source 431 may be configured to emit an infrared laser, in consideration of coherency and invisibility, and an infrared laser diode may be used as the light source 431. The converter may be configured to convert the infrared laser emitted from the light source 431 into the plurality of reference points R. In the output device 400, the converter may include a micromirror/microscanner 432. The mirror 432 may be configured to perform two-axis rotation by an actuator. More specifically, the mirror 432 may be rotated at a high speed in a tilted position by an actuator disposed on two orthogonal axes. Thus, the mirror 432 may deflect or reflect an incident infrared laser. In addition, the mirror 432 may change the tilt angle thereof during high-speed rotation, thereby scanning the deflected or reflected laser in desired directions. By such reflection and scanning, the infrared laser may form a plurality of reference points R uniformly distributed in the surrounding space. Accordingly, the mirror 432 may reflect and scan the incident laser from the light source 331 to form the plurality of reference points emitted in desired directions. More specifically, the head 420 may have an aperture 421 disposed adjacent to the mirror 432. The laser reflected by the mirror 432, that is, the reference points R, may be emitted to the surrounding space through the aperture 421.

In addition, the output device 400 may include a substrate 434 on which various electronic components for controlling the operation of the output device are mounted. The output device 400 may be operated or stopped by manipulating the switch 436. The output device 400 may be operated or stopped using the terminal 411. Control of the operation and stopping of the output device 400 using the switch 436 and the terminal 411 has already been described in detail in relation to the output device 200. Thus, the description of the output device 200 in relation to operation and stopping is referred to, and further description will be omitted. In addition, although not shown, the output device 400 may include a battery for supplying power to other components. The battery may be charged by the smart device 100 or other power sources via the terminal 411. Thus, the output device 400 may operate using the battery even when removed from the smart device 100. The components 434 and 236 described above may all be accommodated in the body 410 and the head 420.

Furthermore, the output device 400 may include a mechanism capable of adjusting the orientation of the output device. This adjustment mechanism may allow the output device 400 to accurately emit reference points R within the viewing angle of the user/camera 121b. In addition, since the head 410 in the output device 400 emits the reference points R, the adjustment mechanism may be configured to adjust the orientation of the head 410. Referring to FIG. 20, the output device 400 may include a pair of legs or flanges 422, which are formed on the head 420 and rotatably connected to the body 410, as the adjustment mechanism. More specifically, the legs 422 may have a hinge shaft 423 formed on the body thereof, and the hinge shaft 423 may be rotatably connected to the body 410. For example, the hinge shaft 423 may be inserted into a hole formed in the body 410. Thus, the head 420 may rotate together with the legs 422 around the hinge shaft 423, that is, around an axis perpendicular to the central axis of the output device 400. By this rotation, the head 420 may adjust the orientation thereof and emit the reference points R in the correct directions. In addition, as shown in FIG. 20, the output device 400 may have a bottom portion 412 of the body 410 formed to be flat as a support mechanism. The flat bottom portion 412 may allow the output device 400 to be stably placed on an indoor floor. Therefore, the output device 400 may be stably supported at a location remote from the smart device 100 even without a separate cradle.

Since the output devices 200, 300, and 400 use infrared lasers of a high energy level, they may be heated to unnecessarily high temperatures if they are used for a long time. In addition, as previously mentioned, including a number of electronic components within a small area may be a cause of increasing the temperature of the output devices 200, 300 and 400 while the output devices are in use. Such heating may burn the user or cause malfunction of the output device 200. Thus, the output devices 200, 300, 400 may further include fins configured to dissipate heat. As described above, the output device 200 may include fins 212 as a heat dissipating structure, and fins at least functionally similar to the fins 212 may be applied to the other output devices 300 and 400. In addition, in terms of structure, the structure of the fins 212, which are contractively extendable, may also be applied to the other output devices 300 and 400.

In order for the smart device 100 to correctly track the motion thereof, it may be advantageous that the reference points are uniformly distributed over as wide an area as possible. However, it may be equally important that such reference points R are arranged in the correct position, i.e., in the direction of the line of sight of the camera 121b/the user. The correct arrangement of the reference points R may depend on the orientation of the output devices 200, 300 and 400. That is, orienting the output devices 200, 300, 400 in the correct direction may be indispensable for arranging the reference points R at the correct positions. Thus, the output devices 200, 300 and 400 may be configured to adjust the orientations thereof. The output devices 200, 300 and 400 may adjust the orientations thereof to emit the reference points R within the desired space, i.e., within the viewing angle of the camera 121b/user. To enable this orientation adjustment, the output devices 200, 300 and 400 may include a portion that is configured to emit the reference points R and is movable. That is, since the heads 220, 320 and 420 in the output devices 200, 300 and 400 actually emit the reference points R, the output devices 200, 300, and 400 have the heads 210, 310 and 410 movably configured for orientation adjustment. More specifically, the output device 200, 300, 400 may include a head 220, 320, 420 that is rotatably configured for orientation adjustment. For example, as already described above, the head 320 of the output device 300 may rotate about the central axis thereof using the first and second flanges 312 and 324, and the head 420 of the output device 400 may rotate about an axis perpendicular to the central axis thereof using the legs and hinge shafts 422 and 434. These rotating structures are applicable not only to the output device 200 but also to the output devices 300 and 400. Furthermore, the output device 200, 300, 400 may include a portion, e.g., a head 210, 310, 420 which emits reference points R and is rotatable to be oriented in a plurality of directions. More specifically, the heads 210, 310 and 420 may be moved or rotated so as to be oriented toward any portion in the space with respect to the ground on which the output devices 200, 300 and 400 are disposed.

Further, the reference points R are kept stationary by the output devices 200, 300, and 400 fixed at the remote locations. On the other hand, the camera 121b of the smart device 100 may move along with the device 100 while the smart device 100 is moving, acquire images of the reference points R at a moved point of view, and detect relative change in position from the acquired images. That is, the motion of the smart device 100 may be tracked by the smart device 100 itself, which actually moves separately from the output device at a remote location and the reference points R provided by the output device. Therefore, the reference points R emitted in the surrounding space may also be used by other smart devices. That is, the smart device 100 may share the multiple reference points R thereof with other smart devices such that the other devices track the motion thereof.

The smart device 100 may further include a sensing device configured to sense attachment and detachment of the output device 200, 300, 400. Various elements may be employed as the sensing device. For example, the sensing device may include a Hall sensor 238, 338, 438, which is installed on one of the output device 200, 300, 400 and the body of the smart device 100, and a magnetic member, which is installed on the other one of the output device 200, 300, 400 and the body of the smart device 100. As shown in FIGS. 12, 15 and 19, the Hall sensor 238, 338, 438 may be installed on the output device 200, 300, 400, more specifically, on the substrate 234, 334, 434. Although not shown, the magnetic member may be installed on the device 100. Alternatively, the Hall sensor may be installed on the smart device 100 and the magnetic member may be installed on the output device 200, 300, 400. The Hall sensors 238, 338, and 438 may sense the intensity of a magnetic field therearound. When the output device 200, 300, 400 is removed from the smart device 100, the magnetic member of the smart device 100 moves away from the Hall sensor 238, 338, 438, and accordingly the sensed intensity of the magnetic field may become relatively weak. Accordingly, the sensing device, i.e., the Hall sensor 238, 338, 438, may sense removal of the output device 200, 300, 400 by sensing the intensity of the weakened magnetic field. On the other hand, when the output device 200, 300, 400 is mounted on the smart device 100, the magnetic member of the smart device 100 approaches the Hall sensor 238, 338, 438. Accordingly, the sensing device, i.e., the Hall sensor 238, 338, 438, may sense attachment of the output device 200, 300, 400 by sensing the increased intensity of the magnetic field. The operation of the output device 200, 300, 400 may be controlled using the sensing of the sensing device. The output device 200, 300, 400 needs to be separated from the smart device 100 in order to provide fixed reference points R. That is, the output device 200, 300, 400 is preferably actually operated until it is removed from the smart device 100. Accordingly, when the smart device 100 senses removal of the output device 200, 300, 400 through the sensing device, it may immediately instruct the output device 200, 300, 400 to operate. The output device 200, 300, 400 may autonomously start to operate upon sensing the removal through the sensing device. Thus, the output device 200, 300, 400 may be configured to automatically operate when removed. On the other hand, the output device 200, 300, 400 may not need to operate when mounted on the smart device 100. Accordingly, when the smart device 100 or the output device 200, 300, 400 senses mounting of the device on the smart device 100 through the sensing device, the operation of the output device 200, 300, 400 may be immediately stopped. By using the sensing device as described above, the operation of the output devices 200, 300, and 400 may be controlled more conveniently and effectively.

Intended tracking of the motions of the smart device 100 and the head may be achieved primarily by the structure of the smart device 100 described above. In order to more specifically achieve such an intended technical object, appropriate control needs to be supported in consideration of the structure and characteristics of the device 100. Implementation of the functions of the smart device 100 basically includes interaction with the user. Thus, through optimization of control in various aspects, including the user environment and user interface, the above-described technical object may be achieved more effectively and efficiently. Furthermore, the user experience of the smart device 100, such as ease of use and convenience, may also be significantly improved. That is, optimum control may further increase the commercial value of the smart device 100. For this reason, a control method for the smart device 100 has been devised and will be described hereinafter with reference to the related drawings as well as FIGS. 1 to 20. FIGS. 1 to 20 and the description thereof are basically included and referenced in the following description of the control method and related drawings, unless otherwise indicated.

Figure 21:
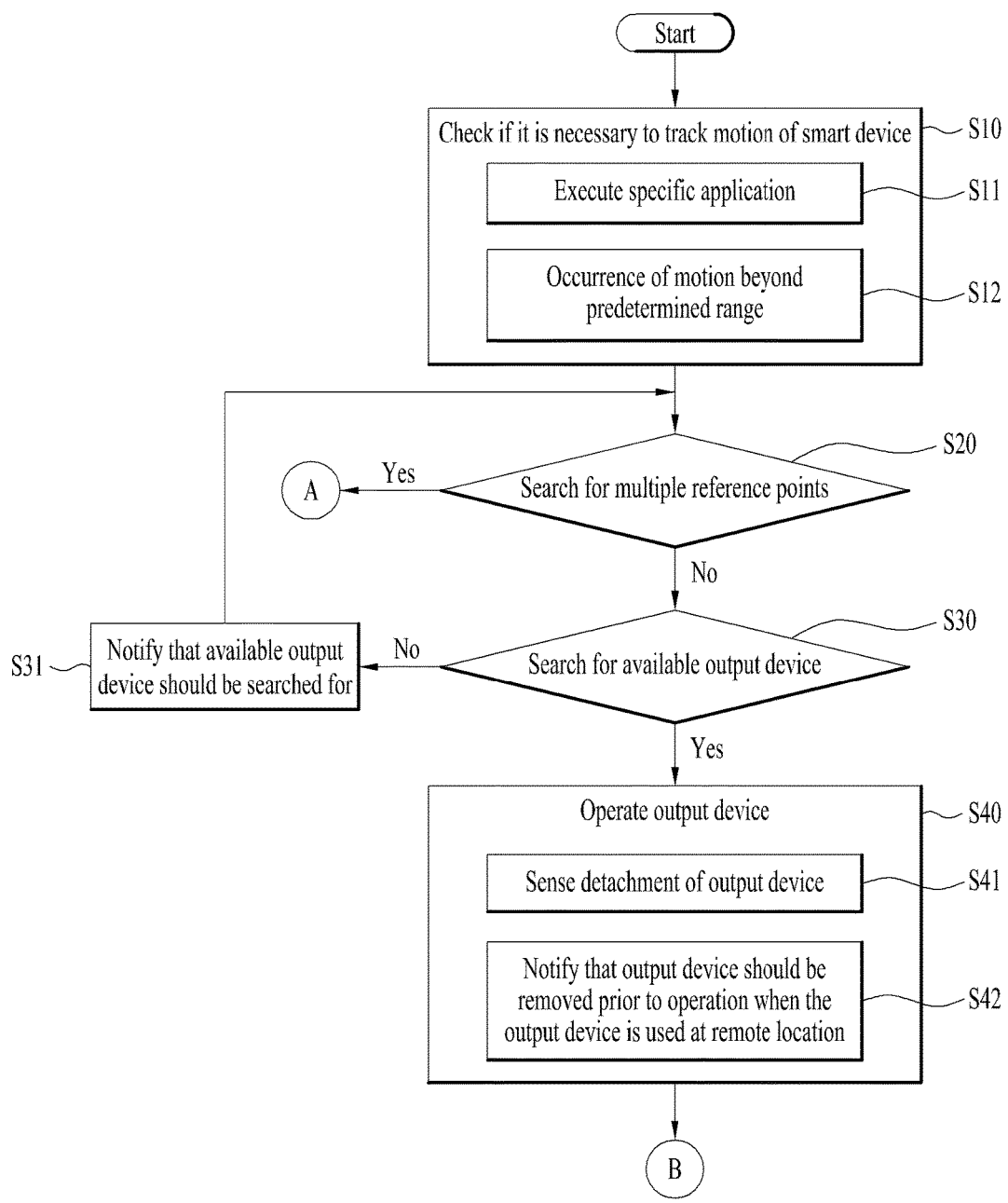
FIG. 21 is a flowchart illustrating an example of a method for controlling a smart device described in the present application.
Figure 22:
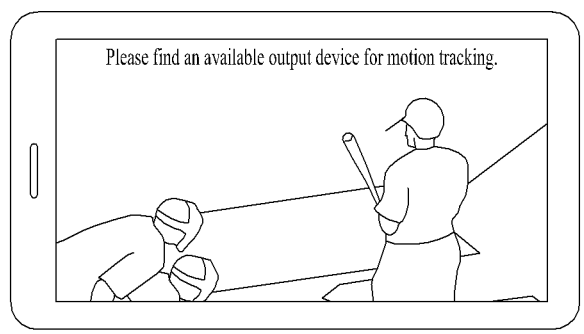
FIG. 22 is a conceptual diagram showing examples of notifications provided to the user in the method for controlling a smart device.
Figure 22:
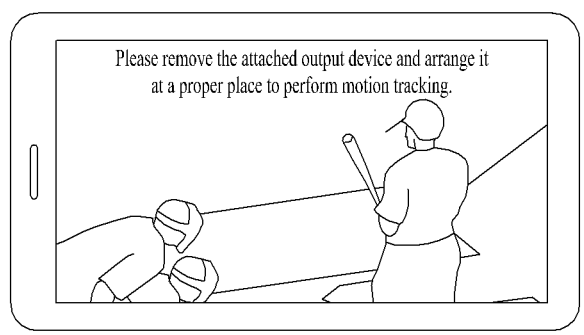

As described above, motion tracking of the smart device 100 may be required only in special cases. Thus, if the smart device 100 always tracks the motion thereof, this may waste system resources, leading to shortening of operation time and malfunction. Therefore, it may be important to determine a time to start tracking motion in providing the best virtual reality in the smart device 100. Therefore, the control method described below may include determining the time. The control method may also include a step of preparing the smart device 100 and the output device 200, 300, 400 thereof to track the motion after the tracking is determined. FIG. 21 is a flowchart illustrating an example of a method for controlling a smart device described in the present application. FIG. 22 is a conceptual diagram showing examples of notifications provided to the user in the method for controlling a smart device. As mentioned above in describing the structure of the smart device 100, the control unit 180 may be referred to by various names such as a controller and a control device and may control all components of the smart watch 100 in order to perform a predetermined operation. Thus, the control unit 180 may substantially control the method included in this application, namely, all the steps according to FIGS. 8, 21 and 22, and therefore all the steps which will be described hereinafter may be features of the control unit 180.

First, the smart device 100 may check if it needs to track the motion thereof (S10). The smart device 100 does not need to always track the motion thereof, and may be required to track the motion thereof only in special cases. First, the smart device may detect whether a specific application is executed (S11). The specific application may be, for example, a gaming application that is manipulated by the motion of the user's head. The specific application may be any application that requires tracking of the motion of the user's head. When the specific application is executed, the smart device 100 may determine that tracking the motion thereof is needed. That is, the smart device 100 may determine to start tracking the motion according to such necessity. In addition, for faster determination, the smart device 100 may detect whether a preliminary operation for executing the specific application is performed prior to actual execution of the specific application. This preliminary operation may be, for example, an operation of establishing the settings before executing a game. Once the preliminary operation is performed, the smart device 100 may determine tracking of the motion.

The sensors in the smart device 100, for example, gyro sensors or acceleration sensors, may continuously detect and track the rotational motion, but cannot continuously detect and track the translational motion, which constitutes most of the motion of the head. However, since these sensors may detect translational motion within a limited range (or degree), it may be possible to detect whether such translational motions have occurred, even though the actual degree of translational motions occurring beyond a relatively limited range may not be detected. Accordingly, the smart device 100 may detect whether the motion of the smart device 100, particularly the translational motion, occurs beyond a certain range (S12). If the motion of the smart device 100 occurs beyond the certain range, the smart device 100 may determine that motion of the head has substantially occurred. Further, based on this determination, the smart device 100 may determine that the function it is providing substantially requires tracking of the motion of the smart device 100. Accordingly, the detection step S12 may be performed when the smart device 100 provides a predetermined function, for example, when the smart device 100 performs a predetermined operation or executes a predetermined application. As a result, if the motion of the smart device 100 occurs beyond the certain range, the smart device 100 may determine that it needs to track the motion thereof and may accordingly determine to start motion tracking.

When it is determined that the motion of the smart device 100 needs to be tracked in the checking step S10, that is, when such tracking of the motion is substantially determined, the smart device 100 may search for a plurality of reference points (R) present in a surrounding space (S20). In the searching step S20, the smart device 100 may acquire an image of the surrounding space using the camera 121b. Subsequently, the smart device 100 may analyze the acquired image to check if there is a plurality of reference points (R). When the reference points R are formed by infrared light and the camera 121b is configured as an infrared camera, the camera 121b may acquire images of infrared objects, which are invisible. Therefore, it may be easily checked whether there are reference points R in the surrounding space by checking the infrared camera 121*b* for the reference points R having a predetermined shape. In addition, as described above, the reference points R may remain fixed and motion tracking of the smart device 100 may be performed by the smart device 100, which actually moves, separately from the provision of the reference points R. Accordingly, the reference points R emitted in the surrounding space may be shared by different smart devices 100. Thus, in the searching step S20, the reference points R emitted not only from the output device 200, 300, 400, but also from output devices of others devices may be searched for. For simplicity, the following description refers to only the output device 200 among the output devices, but it will be understood that each of the steps described below includes both the use of the output device 200 and use of other output devices 300, 400.

When the smart device 100 finds the reference points R in the surrounding space in the searching step S20, the smart device 100 may immediately start motion tracking. In this tracking process, since the reference points R are already provided in the surrounding space, it may not be necessary to additionally provide reference points R in the surrounding space. Therefore, except for the emitting step S1 of FIG. 5, steps S3 to S5 may be sequentially performed to track the motion, starting with the acquiring step S2, as indicated by a symbol "A" in FIGS. 5 and 8.

If the smart device 100 fails to find the reference points R in the surrounding space in the searching step S20, a request for the reference points R may be made to the smart device 100 first in order to track the motion. Accordingly, in order to secure the reference points R, the smart device 100 may additionally search for an available output device 200 (S30). The output device 200 may be available regardless of whether it is mounted on or removed from the smart device 100. That is, the mounted output device 200 may be removed from the smart device 100 for operation. If the output device 200 is already removed, it may be operated immediately to emit the reference points R. Accordingly, in the searching step S30, the smart device 100 may search for both the output device 200 mounted on the smart device 100 and the output device 200 removed from the smart device 100. This searching step may be performed using a sensing device as described above. For example, the mounted or removed output device 200 may be searched for by the Hall sensor and the magnetic member installed on the output device 200 and the device 100, respectively. Further, when the output device 200 is additionally configured to perform communication, the smart device 100 may easily search for the output device 200 removed therefrom. For example, the output device 200, which may include various communication modules, may include a near field communication module, for example, an NFC tag, as the simplest form of communication module. Therefore, even if removed from the smart device, the output device 200 including such a communication module may be easily searched for by the smart device 100. Further, as described above, the reference points R may be shared by different smart devices 100. Accordingly, in the searching step S30, the smart device 100 may search for both the output device of the smart device 100 and the available output devices of the other smart devices. Similarly, if the output device 200 of another smart device includes a communication module such as an NFC tag, it may be easily searched for by the smart device 100. Further, since the output devices mounted on or removed from the smart device 100 and other smart devices are all available devices as described above, the output devices 200 may be searched for by the smart device 100 in the searching step S30.

If the smart device 100 fails to find any available output device 200 in the searching step S30, the smart device 100 may notify the user that an available output device 200 should be searched for (S31). For example, as shown in FIG. 22(*a*), the smart device 100 may provide, on the display unit 151, a notification such as "Please find an available output device for motion tracking". After providing the notification, the smart device 100 may temporarily suspend the function currently being provided. That is, since the function using the motion tracking cannot be provided, the operation or the application that is being executed may be temporarily stopped. At the same time, the smart device 100 may continuously search for an available output device 200 in the searching step S30. In addition, since the user may bring the output device 200 and immediately operate the same to provide the reference points R, existence of the reference points may also be continuously searched for in the searching step S20.

When the smart device 100 finds an available output device 200 in the searching step S30, the smart device 100 may operate the available output device 200 (S40). Fixed reference points R should be provided to detect change in position. Thus, the output device 200 needs to be primarily removed or detached from the smart device 100 so as not to move along with the smart device 100. Therefore, if the output device 200 is mounted on the smart device 100 in the operating step S40, the output device 200 may first be removed or detached from the smart device 100. In addition, to provide uniform reference points R, the output device 200 needs to be stably arranged at a remote location away from the smart device 100 after being removed and detached. As described above, for this arrangement, the output device 200 may have a support structure, and a separate support structure such as a cradle may also be used. If the output device 200 is already removed from the smart device 100, then the output device 200 may be stably arranged in a similar manner for emission of reference points R. The output device 200 of another smart device 100 operable due to the shareable reference points R may also be operatively prepared according to the same procedure as described above. That is, the other mounted output device 200 may be removed from the other smart device 100, and be stably arranged.

As described above, the actual operation of the output device 200 requires removal of the output device 200 first. Accordingly, the smart device 100 may notify the user that the output device 200 should be removed from the smart device 100 before the operating step S40 is performed (S42). For example, as shown in FIG. 22(*b*), the smart device 100 may provide, on the display unit 151, a notification such as "Please remove the attached output device and arrange it at a proper place to perform motion tracking". More specifically, the notifying step S42 may be performed before the output device 200 is actually removed from the smart device 100 in the operating step S40 because there is an available output device 200. Furthermore, since the notification corresponds to a preliminary or precautionary alert, the notifying step S42 may be performed to provide the notification, regardless of whether or not the available output device 200 is mounted on or removed from the smart device 100. In the notifying step S42, the user may be pre-guided by the notifying step S42 to perform the operating step S40. Accordingly, the user may use the smart device 100 more conveniently, and motion tracking of the smart device 100 may be performed more reliably.

In addition, before the notifying step S42, the smart device 100 may additionally sense attachment or detachment of the output device 200 (S41). As already described above, attachment or detachment of the output device 200 may be sensed using a sensing device or a short-range communication module. Since the output device 200 is electrically connected to the smart device 100 using the terminal 211, presence or absence of the electrical connection may allow the smart device 100 to easily sense the attachment or detachment of the output device 200. Further, when communicatively connected to another smart device, the smart device 100 may receive attachment or detachment of the output device of the other smart device from the other smart device. If it is sensed that the output device 200 is mounted on the other smart device, the smart device 100 may notify the user of detachment of the output device 200 through the notifying step S42. If it is sensed that the output device 200 is removed, the, the smart device 100 may notify the user that the removed output device 200 should be operated. The smart device 100 may directly instruct the removed output device 200 equipped with the communication module to operate. Furthermore, the output device 200 may be configured to operate automatically when removed from the smart device. In this case, the smart device 100 may instruct the output device 200 to operate upon sensing detachment of the output device 200, or the output device 200 may automatically start to operate when removed from the smart device.

As described above, when the removed output device 200 is disposed at an appropriate remote location, the output device 200 may be operated to actually emit reference points. For example, the output device 200 may be operated by pressing the switch 236. In addition, if the output device 200 includes a communication module, the smart device 200 may remotely support the operation of the output device 200. Thus, steps S3 to S5 may be sequentially performed to track the motion, starting with the emitting step S1, as indicated by a symbol "B" in FIGS. 5 and 8.

In the control method of the present application described above, the time of occurrence of motion may be determined by detecting a special case in which motion tracking is needed. In addition, after tracking is determined, the control method may appropriately prepare the smart device 100 and the output device 200, 300, 400 thereof such that motion may be tracked. That is, in the control method, the previously provided reference points R and the available output devices 200, 300, and 400 may be searched for, and a notification for additional search and operation of the available output devices 200, 300, and 400 may be provided to the user at an appropriate time. Thus, the control method may effectively track motion of the smart device 100 and the head, and allow the user to more easily utilize virtual reality.

Therefore, the above embodiments should be construed in all aspects as illustrative and not restrictive. The scope of the disclosure should be determined by the appended claims and their equivalents, and all changes coming within the meaning and equivalency range of the appended claims are intended to be embraced therein.

The invention claimed is:

1. A smart device comprising:
   a body;
   an output device detachable from the body and configured to provide a plurality of reference points in a surrounding space;
   a camera configured to acquire images of the provided reference points; and
   a control device configured to:
      track motion of the smart device using the acquired images,
      search for the plurality of reference points provided by the output device in the surrounding space when it is necessary to track the motion of the smart device,
      searching for an additional output device of another smart device available for the smart device when the plurality of reference points are not found, and
      operate the additional output device when the additional output device is found.

2. The smart device according to claim 1, wherein the output device and the camera continuously provide reference points and acquire images thereof while the smart device is moving,
   wherein the reference points have predetermined patterns to be easily recognized, the patterns being different from each other, and
   wherein the output device provides reference points formed by infrared light, and the camera comprises an infrared camera capable of photographing the infrared reference points.

3. The smart device according to claim 1, wherein the control device is configured to:
   construct a three-dimensional map of predetermined reference points based on positions of a predetermined number of the predetermined reference points acquired from the images,
   continuously detect a relative positional change of the predetermined reference points with respect to the three-dimensional map using the images, and continuously detect a position of the smart device based on the detected positional change, and
   extend the three-dimensional map based on positions of additional reference points as a range of motion of the smart device extends.

4. The smart device according to claim 1, wherein the output device comprises:
   a light source configured to emit infrared laser; and
   a converter configured to convert the emitted infrared laser into the plurality of reference points.

5. The smart device according to claim 4, wherein the converter comprises a diffusing member configured to uniformly disperse the emitted infrared laser, and
   wherein the converter further comprises a filter configured to selectively pass the infrared laser dispersed by the diffusing member to emit the reference points.

6. The smart device according to claim 4, wherein the converter is configured to diffract the emitted infrared laser to form the plurality of reference points, or
   wherein the converter is configured to reflect the emitted infrared laser in a plurality of directions to form the plurality of reference points.

7. The smart device according to claim 1, wherein the output device is disposed at a location spaced apart from the body to provide the plurality of reference points,
   wherein the output device further comprises a fin configured to dissipate heat and to contractively extend from the output device, wherein the output device is configured to adjust an orientation thereof to provide the reference points in a desired space, and
   wherein the smart device shares a plurality of reference points provided by an output device of another smart device to track the motion thereof.

8. The smart device according to claim 1, further comprising a head-mounted device configured to accommodate the body, the head-mounted device being worn on a head of a user, wherein the controller tracks motions of the head-mounted device and the head of the user wearing the smart device by tracking the motion of the smart device.

9. A method for controlling a smart device, the method comprising:
searching for a plurality of reference points in a surrounding space when it is necessary to track motion of the smart device;
emitting the reference points and searching for an output device available for the smart device when the plurality of reference points are not found; and
operating the output device when the output device is found.

10. The method according to claim 9, wherein the operating comprises:
removing an output device mounted on the smart device from the smart device; and
disposing the removed output device at a position spaced apart the smart device.

11. The method according to claim 9, further comprising notifying a user that the output device should be removed from the smart device so as to be used at a remote location, the notifying being performed prior to the operating step, and
further comprising sensing whether the output device has been removed from the smart device, the sensing being performed prior to the notifying.

12. The method according to claim 9, wherein the operating comprises:
operating one of the output device of the smart device and an output device of another smart device.

13. The method according to claim 9, further comprising:
notifying a user that the available output device should be searched for when the available output device is not found.

14. The method according to claim 9, wherein the searching is performed when the smart device executes a specific application or when motion of the smart device occurs beyond a predetermined range.

15. The method according to claim 9, further comprising, when the plurality of reference points is found in the searching:
continuously acquiring, by the smart device, images of the reference points while the smart device is moving;
constructing a three-dimensional map of predetermined reference points based on positions of a predetermined number of the predetermined reference points acquired from the images;
continuously detecting a relative positional change of the predetermined reference points with respect to the constructed three-dimensional map using the images; and
continuously detecting a position of the smart device based on the detected positional change.

16. The method according to claim 9, wherein the searching of the output device comprises:
searching for an output device mounted on the smart device and an output device removed from the smart device; or
searching for an output device of the smart device and an available output device of another smart device.

17. A smart device comprising:
a body;
an output device detachable from the body and configured to provide a plurality of reference points in a surrounding space;
a camera configured to acquire images of the provided reference points; and
a control device configured to track motion of the smart device using the acquired images,
wherein, when the plurality of reference points is not found through the camera, the control device notifies a user that the output device should be removed from the smart device before the output device is operated.

18. The smart device according to claim 17, wherein the control device immediately operates the output device when it is sensed that the output device has been removed,
wherein, when it is sensed that the output device is mounted, the control device notifies the user that the output device should be removed.

19. The smart device according to claim 17, wherein the control device is configured to share reference points provided by an output device of another smart device to track the motion of the smart device.

20. The smart device according to claim 17, wherein, when the plurality of reference points is not found, the control device is configured to operate one of the output device of the smart device and an output device of another smart device, and
wherein, when there is no available output device, the control device notifies the user that an available output device should be searched for.

* * * * *